US012546485B2

(12) United States Patent
Bockler et al.

(10) Patent No.: US 12,546,485 B2
(45) Date of Patent: Feb. 10, 2026

(54) APPLIANCE, IN PARTICULAR COOKING APPLIANCE

(71) Applicant: ELECTROLUX APPLIANCES AKTIEBOLAG, Stockholm (SE)

(72) Inventors: Marco Bockler, Rothenburg ob der Tauber (DE); Magdalena Moll, Rothenburg ob der Tauber (DE); Tim Breuer, Rothenburg ob der Tauber (DE); Branko Ivanovic, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 364 days.

(21) Appl. No.: 18/025,655

(22) PCT Filed: Aug. 3, 2021

(86) PCT No.: PCT/EP2021/071609
§ 371 (c)(1),
(2) Date: Mar. 10, 2023

(87) PCT Pub. No.: WO2022/053226
PCT Pub. Date: Mar. 17, 2022

(65) Prior Publication Data

US 2023/0250968 A1 Aug. 10, 2023

(30) Foreign Application Priority Data

Sep. 10, 2020 (EP) .................................... 20195478

(51) Int. Cl.
*F24C 15/16* (2006.01)
*E05F 15/627* (2015.01)
*E05F 15/73* (2015.01)

(52) U.S. Cl.
CPC .......... *F24C 15/162* (2013.01); *E05F 15/627* (2015.01); *E05F 15/73* (2015.01); *E05F 2015/763* (2015.01)

(58) Field of Classification Search
CPC ...... F24C 15/162; F24C 15/168; E05F 15/73; E05F 15/627; E05F 2015/763;
(Continued)

(56) References Cited

U.S. PATENT DOCUMENTS 2,296,950 A * 9/1942 Roedl .................. F24C 15/162
126/340
2,987,363 A * 6/1961 Morse .................. F24C 15/162
312/274

(Continued)

FOREIGN PATENT DOCUMENTS

DE 4236740 5/1994
DE 102015115573 3/2017
EP 0541974 5/1993

OTHER PUBLICATIONS

Written Opinion and International Search Report for PCT/EP2021/071609 dated Jan. 5, 2022, 6 pages.

(Continued)

*Primary Examiner* — Alfred Basichas
(74) *Attorney, Agent, or Firm* — Chrisman Gallo Tochtrop LLC

(57) ABSTRACT

An appliance is disclosed. The appliance includes a cavity, a door associated with a front opening, a rack including at least one carrier support for supporting at least one carrier. The rack is movably associated with the cavity interior so as to be movable in an extraction and retraction movement. One or more motorized drive units and a kinematic coupling mechanism are also included. The kinematic coupling mechanism includes one or more kinematic coupling units and is configured for providing a kinematic coupling (Continued)

between the one or more motorized drive units and at least one of the rack and the carrier. The one or more motorized drive units and the kinematic coupling mechanism are configured such that an operation of the one or more motorized drive units is translated into at least one of the extraction movement and retraction movement of at least one of the rack and the carrier.

19 Claims, 6 Drawing Sheets

(58) Field of Classification Search
CPC ......... E05F 15/75; E05F 15/71; A47L 15/507; A47B 96/16; E05Y 2900/308
See application file for complete search history.

(56) References Cited

U.S. PATENT DOCUMENTS

| | | | |
|---|---|---|---|
| 3,009,458 | A | 11/1961 | Pearce |
| 7,901,019 | B2 | 3/2011 | Laundroche |
| 2009/0165258 | A1 | 7/2009 | Laundroche |
| 2019/0306932 | A1* | 10/2019 | Shin .................... E05B 47/0046 |

OTHER PUBLICATIONS

European Communication for application No. 20195478.1 dated Jul. 7, 2025, 92 pages.

* cited by examiner

APPLIANCE, IN PARTICULAR COOKING APPLIANCE

CROSS REFERENCE TO RELATED APPLICATIONS

This application is a national phase of PCT/EP2021/071609, filed Aug. 3, 2021, which claims priority to European patent application 20195478.1, filed Oct. 9, 2020, the content of both of which are herein incorporated by reference.

BACKGROUND OF THE INVENTION

Field of the Invention

The present invention relates to an appliance, in particular a cooking appliance, such as a baking oven.

Description of Related Art

Various types of household appliances comprise cavities with associated doors for closing the cavities. The cavities of such appliances may be configured for accommodating therein extractable and retractable carriers, such as object carriers, in particular trays or grids, for the accommodation of objects such as food items, dishes, crockery, cutlery and the like.

Some known appliances comprise drive units for opening and closing the door. For example, EP 2 584 271 A1 describes a domestic appliance with a drive unit that is activatable by the user and configured for opening and closing the door in response to a user activation. Document DE 10 2009 026 670 A1 describes a similar domestic appliance with a drive unit for opening and closing the door. Such drive units may support the user in operating the appliance.

Albeit there exist some solutions supporting a user in operating the appliance, as discussed beforehand, there is still room for further improvement, in particular with regard to assisting the user in handling the appliance, for example in connection with handling carriers, such as grids or trays.

BRIEF SUMMARY OF THE INVENTION

It is an object of the present invention to provide an appliance, in particular a cooking appliance, such as a baking oven, that provides improved assistance for users with regard to handling the appliance. In particular, it is an object of the invention to provide an appliance that provides improved assistance in connection with handling carriers, such as trays and grids, of the appliance under ordinary use conditions.

According to the claims, an appliance, in particular a cooking appliance, such as a baking oven is provided. The appliance comprises a cavity, a door, a rack, one or more motorized drive units, and a kinematic coupling mechanism, which will be described in further detail below.

The appliance, i.e., an electric appliance, may be a household appliance, a kitchen appliance, a cooking appliance, a baking oven, a refrigerator, a dishwasher or similar.

The cavity of the appliance comprises a back wall and a front opening that is located opposite the back wall, i.e. an opposite front opening. The cavity may further comprise a bottom wall and a top wall, extending substantially horizontally and extending between the back wall and the front opening. The cavity may further comprise two lateral side walls extending substantially vertically and between the back wall and the front opening. The cavity interior may, based on the mentioned components, be delimited by the back wall, the two lateral side walls, the bottom and top wall, and the front opening. The terms bottom, top, back, front, and lateral shall refer to the ordinary use orientation and position of the appliance.

The cavity is configured for accommodating one or more carriers, in particular object carriers, more particularly trays or grids, through the front opening. For example, in case of a baking oven, the cavity is configured for accommodating therein one or more baking trays or support grids at different height levels. The front opening in particular is arranged to enable carriers being removed from and inserted into the cavity via the front opening in an extraction and retraction movement.

A carrier in this connection in particular refers to a carrier element having a two-dimensional extension, such as for example a substantially planar area or surface, for accommodating and carrying objects, such as food items, dishes, cutlery, and other items to be positioned within the cavity of the appliance, in particular in its intended use.

The door of the appliance is associated with the front opening and configured for opening and closing the front opening. The door may for example be hinged at a frame or structural component of the appliance such that the door can be pivoted around a horizontal and/or vertical hinge axis for opening and closing the front opening. The door may hinged, in particular pivoted, to open to the outside. The expression “to open to the outside” in particular shall mean that opening the door is associated with a movement of sections of the door away from the cavity. Other types of doors may be envisaged, such as sliding doors or sectional doors.

The door may be hinged, for example to a frame, frame sections and/or to a front panel of the appliance, by means of a horizontal hinge axis or pivot axis, and/or by means of a vertical hinge axis or pivot axis, wherein the “and/or” shall mean that the door may be attached with a suitable mechanism enabling either a movement around a horizontal pivot axis or a movement around a vertical pivot axis based on different settings of the mechanism, for example selectable or settable by the user and/or via a corresponding mechanism of the appliance.

The rack of the appliance comprises at least one carrier support for supporting, within the cavity, at least one carrier, such as a tray or grid for accommodating and supporting objects within the cavity. The rack is movably associated with the cavity interior such that the rack is movable in an extraction and retraction movement. The term extraction and retraction movement shall refer to moving a carrier at least to a certain extent out of the cavity and at least to a certain extent into the cavity, for example.

The kinematic coupling unit comprises one or more kinematic coupling units. The kinematic coupling units may for example be implemented as, but not limited to, coupling members, bars, rods and other types of constructional elements and components, or groups thereof, suitable for establishing a kinematic coupling between at least two (movable) components parts of the appliance.

The kinematic coupling mechanism, in particular the kinematic coupling units, are configured for providing a kinematic coupling between the one or more motorized drive units and at least one of the rack and the carrier. The kinematic coupling mechanism, in particular the kinematic coupling units, may for example establish at least one of a direct or indirect kinematic coupling between the rack and at least one of the one or more motorized drive units.

The one or more motorized drive units and the kinematic coupling mechanism are configured, for example by means of mechanical kinematic interconnections, electro-mechanical kinematic interconnections, and/or electro-magnetic kinematic interconnections, in particular couplings, such that an operation of the one or more motorized drive units is translated into at least one of the extraction movement and retraction movement of at least one of the rack and the carrier.

By the action of the one or more motorized drive units and by the kinematic coupling, at least one of the rack and the carrier may be moved semi-automatically or automatically in an extraction or retraction movement, for example as desired by the user. In case where the kinematic coupling is established with the rack, a carrier ordinary placed on the rack is moved in concert with the rack in the extraction and retraction movement. In case wherein the kinematic coupling is established directly between the motorized drive unit and the carrier, it is not absolutely necessary to move the rack; however, such embodiments may involve movements of the rack. If the rack in such embodiments is kinematically coupled to the door, the door may be moved according to the established kinematic chain between the motorized drive unit, the rack, and the door.

By this, the handling of the appliance may be facilitated for the user. For example, if the user is about to extract or retract a carrier placed on the rack, the extraction or retraction may be carried out semi-automatically or automatically by the action of the one or more motorized drive units.

The one or more motorized drive units may for example be activated by a corresponding activation action of the user. The activation action of the user may for example involve detecting the activation action of the user by a sensor, and receiving, in response to the detection, for example at a controller of the one or more motorized drive units, an activation action signal.

Based on an activation action signal, the one or more motorized drive units may be instructed, by a corresponding controller for example, to operate according to the user intent to carry out an extraction or retraction movement of the rack and/or an opening or closing movement of the door.

The activation action signal may for example be detected as a user input on a user interface of the appliance or of a remote device communicatively coupled with the appliance and/or in response to a user's attempt to move the rack according to the extraction or retraction movement and/or the door according to the opening or closing movement. The activation action signal may for example be generated by a user action indicative of an extraction or retraction movement and/or an opening or closing movement. For example, the activation action signal may be representative of a force applied by the user, either directly or indirectly, to the rack and/or door, wherein the force indicates an extraction or retraction intent of the user. In such embodiments, the user may for example apply a force directly to the rack and/o door, which may be sensed by a force sensor, in turn instructing the motorized drive unit to operate according to the extraction and retraction movement.

In embodiments, the user intent may be sensed by one or more sensor elements provided on a user interface and configured for inputting commands for operating the motorized drive unit. Such commands may for example comprise closing the door, opening the door, extracting the rack, and/or retracting the rack. In such embodiments, a command for extracting the rack may be executed subject to the door being open, in particular fully opened.

In embodiments the appliance may be configured to enable the user to apply an opening and closing force to the door, which may be sensed by a corresponding force sensor. In response to a signal sensed by the force sensor, the control unit may instructing the motorized drive unit to operate according to the extraction and retraction movement. Here, the rack may be kinematically coupled directly to the door which in turn may be kinematically coupled directly to the motorized drive unit. It is, however, also possible that the door and rack are selectively coupled to a respective one of the one or more motorized drive units. In an embodiment a separate motorized drive unit may be provided for the rack and the door.

In embodiments, the activation action signal may be received on a user interface of the appliance and/or a user interface of a remote device. The received activation action signal may be communicated to a control unit for the one or more motorized drive units for driving corresponding motorized drive units according to the extraction or retraction movement. The user interface may comprise or be implemented as a touch sensitive screen, for example.

Receiving the activation action signal via a user interface or based on a concrete manual user action, such as a gesture, may be implemented as alternatives. However, the appliance, in particular one or more control units of the appliance, may be configured for detecting the activation action signal both via the user interface and by a concrete manual user action (gesture). The control unit and corresponding sensors may not only be responsive to touch signals but may also be configured to detect acoustic signals and/or gestures as the activation action signal.

In embodiments, a motorized drive unit may be configured for being kinematically coupled, in particular directly kinematically coupled, to a carrier thereby enabling an extraction and/or retraction movement of the carrier as such.

In embodiments, the appliance, the one or more motorized drive units, and the kinematic coupling may be configured such that the carrier, the rack and/or the door are moved separately, or, at least in part, in concert according to the extraction and retraction movement. In particular embodiments, the appliance may be configured to allow the user to select the type of kinematic coupling and which of the components, i.e. the carrier, the rack and/or the door, are moved at least in part separately, or at least in part in concert.

In embodiments, the one or more coupling units are configured for establishing a kinematic coupling, in particular a direct kinematic coupling, between the door and the motorized drive unit such that an operation of the motorized drive unit is translated into at least one of an opening and closing movement of the door. In such embodiments, the door may be kinematically coupled, in particular directly kinematically coupled, to the rack or carrier, such that the movement of the door is translated into an extraction movement of the rack and/or carrier upon opening the door, and into a retraction movement of the rack and/or carrier upon closing the door. In embodiments, it is possible, that the door on the one hand, and the rack and/or carrier on the other hand are separately kinematically coupled to the one or more motorized drive units, such that the door as such, and the rack and/or carrier as such are moved by the action of a corresponding motorized drive unit. Here, different motorized drive units may be provided for driving the door and the rack and/or carrier, wherein such drive units may be controlled as desired by the user, for example, in a synchronized manner and/or selectively. However, the door and the rack and/or carrier may be coupled to a single motorized drive unit, where the power output side of the motorized drive unit may be kinematically coupled by means of separate transmissions, in particular respectively, to the door, and the rack and/or carrier.

A direct kinematic coupling between the motorized drive unit and the door and/or the rack and/or carrier may be established by a transmission interposed therebetween. Transmissions may be provided as kinematic coupling units between other components directly kinematically coupled with each other.

Embodiments envisage that the door, the rack and/or the carrier may be moved by the one or more motorized drive units separately or at least in part in concert. Which parts to be moved separately or in concert may be predefined, or may be selectable by the user, for example based on a user input menu provided on a user interface associated with the appliance. Providing selectable movements may provide improvements in connection with operation and handling the appliance for the user. If, for example in one use case, the user only wants to open the door for inspecting the cavity interior, such as for example a dish or food item to be cooked within the cavity of a cooking oven, he may instruct the appliance, and accordingly the one or more motorized drive units, via a corresponding activation action to selectively open only the door. If, in a different use case, the user wants to extract or retract the carrier, he may instruct the appliance, and accordingly the one or more motorized drive units, via a corresponding activation action to move both the door and the rack and/or carrier in an extraction or retraction movement, for example. Such selective control commands for the movement of the rack and/or carrier and door may be advantageous, because sometimes the user may wish to open the door and leave a carrier, such as a tray, within the cavity for a certain period of time, for example at the end of a cooking process. Further, a short inspection of a dish does not in any case require extracting the rack and tray from the cavity.

In embodiments, the one or more coupling units and the one or more motorized drive units are configured such that an operation of the one or more motorized drive units is translated into a movement of the door and the rack and/or the carrier. The one or more coupling units and the one or more drive units may be configured and controlled such that the movements of the door and the rack and/or carrier are carried out in a synchronized manner. The movement, in particular the synchronized movement, mediated for example by the one or more coupling units between the motorized drive unit and the door and the rack and/or carrier, may comprise at least one of an opening movement of the door associated with an extraction movement of the rack and/or carrier, and a closing movement of the door associated with a retraction movement of the rack and/or carrier. The expression "synchronized movement" in particular shall mean, without any limitation of generality, that the door and the rack and/or carrier are moved concurrently such that a final extracted or retracted state of the rack and/or carrier is obtained concurrently with the fully opened state or closed state of the door, respectively.

In embodiments, one or more control units for controlling the operation of the one or more drive units may be configured for driving at least one of the door and the rack/and or carrier for the fully opened or fully closed state, or the final extracted or retracted position, respectively, as a default setting. In embodiments, the one or more control units may be configured for enabling the user to limit the opening and closing movement of the door and/or the extraction and retraction movement of the rack and/or carrier in accordance with preset values or with user-set values. For example, the one or more control units may be configured to open the door to a certain angle, e.g. in an inspection operational mode allowing the user to inspect the cavity interior. Further, the one or more control units may be configured to fully open or close the door, and/or to move the rack and/or carrier to the final extracted or retracted position in a corresponding opening and closing or extraction and retraction operational mode. The operational modes may be selectable by a user on a user interface, for example, wherein a corresponding user selection may be detected by the user interface or controller thereof and converted into a command signal for operating the one or more motorized drive units accordingly. By this, great flexibility for user operations in connection with the door and/or the rack and/or carrier movements may be provided.

In embodiments, at least two or more components selected from: the one or more motorized drive units, the rack, the carrier, and the door, are kinematically coupled by means of a kinematic chain for transmitting forces or torques between the motorized drive unit, the door, and the rack and/or carrier, respectively. A kinematic chain in particular shall mean that kinematic couplings are established between different components such that movement of one of the components is dependent on and associated with the movement of the other component(s) within the kinematic chain.

For example, the motorized drive unit may be kinematically coupled directly to the door via a first kinematic coupling unit, e.g. a transmission connecting the power output of the motorized drive unit to the door for opening and closing the door. Further, the door may be kinematically coupled directly to the rack and/or carrier via a second kinematic coupling unit, e.g. a coupling member such as a mechanical coupling member, for example a rod or bar, for translating an opening and closing movement of the door into an extraction and retraction movement of the rack and/or carrier. By this kinematic chain, activation of the motorized drive unit is directly translated into an opening and closing movement of the door via the first kinematic coupling unit, which in turn is directly translated into an extraction and retraction movement of the rack and/or carrier via the second kinematic coupling unit. It shall be noted that the number and type of kinematic coupling units between respective components, and thus the type of kinematic chain, may vary and is not limited to the given examples.

According to an embodiment, at least one of the one or more drive units is kinematically coupled to the door, in particular directly coupled to the door, via a first kinematic coupling unit. The coupling, for example implemented via one or more transmissions, is such that a force or torque generated by an operation of the motorized drive unit is translated into at least one of an opening and closing movement of the door. Further, the door is coupled via a second kinematic coupling unit to the rack, in particular directly coupled to the rack and/or carrier, for example via one or more coupling rods, bars or similar, such that a force or torque generated by at least one of the opening and closing movement of the door is translated into the extraction and retraction movement of the rack and/or carrier, respectively. In particular embodiments the kinematic chain may provide a synchronization between the opening movement of the door and the extraction movement of the rack and/or carrier, and a synchronization between the closing movement of the door and the retraction movement of the rack and/or carrier.

The first and second kinematic coupling units may in embodiments be provided as permanent kinematic joints between respective components. In other embodiments, the kinematic joints provided by the kinematic coupling units between corresponding components may be configurable, for example by a manual user configuration and/or by an automated configuration setting in response to a user selection or user input on an electronic user interface, of the appliance for example.

In embodiments, at least one of the one or more motorized drive units is kinematically coupled, in particular directly coupled, to the rack and/or carrier via a third coupling unit, for example via one or more transmissions and/or one or more coupling members, such that a force or torque generated by an operation of the motorized drive unit is translated into at least one of the extraction and retraction movement of the rack and/or carrier. Further, the rack and/or carrier is kinematically coupled, in particular directly kinematically coupled, via a fourth kinematic coupling unit, for example one or more transmissions and/or one or more coupling members such as one or more rods or bars, to the door such that a force or torque generated by at least one of the extraction movement and retraction movement is translated into the opening and closing movement of the door, respectively. The kinematic chain may in particular embodiments provide a synchronization between the opening movement and the extraction movement, and a synchronization between the closing movement and the retraction movement.

The synchronization may be such that the fully opened position of the door is obtained concurrently with the final extracted position of the rack and/or carrier, and that the closed position of the door is obtained concurrently with the final retracted position of the rack and/or carrier.

The kinematic coupling unit, specifically the coupling member, may be substantially rigid, i.e. a substantially rigid kinematic coupling unit, wherein the term "substantially rigid" shall mean that the kinematic coupling unit is basically stable against bendings out of shape and deflections perpendicular to the lengthwise extension of the kinematic coupling unit, e.g. a coupling member, under ordinary use conditions. The term "rigid" in this connection in particular shall mean that the coupling member as such is stable with regard to the action of mediating movements between the door and the rack. Ordinary and slight bending out of shape that may occur in connection with actions mediating movements between different movable components, e.g. between the door and the rack, for example in case that the rack supports a heavily loaded carrier. Such slight bendings shall still be considered as being covered by the term "substantially rigid". For example, forces occurring during joint movements of the door and rack mediated by a substantially rigid kinematic coupling unit may cause slight bending of the kinematic coupling unit, for example depending on the particular implementation and design of the coupling member. As mentioned, slight bendings out of shape and minor deflections shall be considered as being covered by the term "substantially rigid", in particular because a slight bending out of shape as such is not associated with and a characteristic and requirement for the coupling member to jointly move the door and rack based on the kinematic coupling mediated by the kinematic coupling unit, for example. In this regard, a rigid kinematic coupling unit in such embodiments may be considered as being substantially transversely stable or rigid.

However, the term "rigid" shall not exclude variations in the lengthwise extension, if for example one or more damping elements are provided for damping dynamic loads acting on the kinematic coupling unit in lengthwise direction, for example. Embodiments of a kinematic coupling unit may provide such damping elements. Further, damping elements may be provided in connection with other components suitable for damping dynamic loads occurring in connection with movements of the rack, the carrier, and/or the door during extraction and retraction movements of the rack and/or carrier, and/or opening and closing movements of the door. Such damping elements may for example be provided in connection with or be part of pivot mounts of a kinematic coupling unit, such as a coupling member.

In embodiments, the motorized drive unit is selected from the group comprising, but not limited to: rotary motors and linear motors. The motorized drive unit may comprise or may be kinematically connected to at least one of a belt drive unit, a gear drive unit, in particular a lever-gear drive unit and/or a slewing gear drive unit, and a Bowden drive unit. Respective transmissions may be implemented for example as kinematic coupling units. A rotary motor, in particular a tube motor, and a linear motor may for example be directly coupled to the door and/or the rack and/or carrier. The motorized drive unit, in particular the motor, may for example be coupled to one of a hinge axis and hinge joint of the door. For example, the motorized drive unit, in particular a motor thereof, may be coupled to at least one of the hinge axis and hinge joint, in particular via a transmission, wherein the door is coupled to the hinge axis or hinge joint, such that the action of the motorized drive unit is translated into one of an opening and closing movement of the door.

In embodiments, the motorized drive unit, in particular a motor, may be coupled to at least one of a section of the rack or carrier, for example a section thereof that faces the back wall of the cavity, or to a slide movably supporting the rack and/or carrier within the cavity. The rack or carrier in turn may be kinematically coupled to the door, such that activation of the motorized drive unit driving the rack or carrier according to one of the extraction and retraction movement is translated into an opening and closing movement of the door. However, coupling the door to the rack is not absolutely necessary, for example if the rack as such shall be moved.

In particular, the one or more kinematic coupling units may be arranged and connected between the motorized drive unit, at least one of the door, and the rack and/or carrier, such that a force generated by the motorized drive unit is translated into a force causing the rack and/or carrier to move between the extracted and retracted position, and/or the door to move between the opened and closed position.

In embodiments, the appliance comprises a control unit for activating and/or controlling the motorized drive unit, wherein the control unit is associated with at least one sensor unit configured for sensing at least one of an opening, closing, extraction and/or retraction start and stop action or intent of a user. The control unit may be configured for at least one of activating the motorized drive unit in response to a sensed start action or intent of the user, and deactivating the motorized drive unit in response to a sensed stop action or intent of the user. Thus, the door may be opened and closed, and/or the rack and/or carrier may be extracted and retracted in accordance with the user action or intent by activating the motorized drive unit accordingly. Further, respective movements of the door, and/or the rack and/or carrier may be stopped in response to sensing the stop action or intent.

In embodiments, the sensor unit, i.e. the sensor unit for sensing the start and stop action or intent of the user, is selected from the group comprising: a touch sensitive sensor unit, an acoustically sensitive sensor unit, a gesture sensitive sensor unit, a mechanical sensor unit, a door position sensor unit, a door movement sensor unit, a force sensitive sensor unit arranged to sense opening and/or closing forces applied to the door by a user.

The touch sensitive sensor unit, the acoustically sensitive sensor unit and the gesture sensitive sensor unit may be provided in connection with a user interface of the appliance. The door position sensor unit, the door movement senor unit, and the force sensitive sensor unit may be provided and installed at particular locations of the appliance such that corresponding start and stop actions of a user mediated by moving or stopping the door and/or the rack and/or carrier may be sensed by the appliance.

Accordingly, in one embodiment, the start or stop action of the user may be sensed, and the motorized drive unit may be activated or deactivated to carry out an opening or closing movement of the door, and/or an extraction or retraction movement of the rack and/or carrier. In response to a detected signal, which may be transmitted from the sensor to the control unit, the control unit may activate and deactivate the motorized drive unit. The control unit may for example be implemented in the form of a computerized control unit, involving one or more microcontrollers and/or processors, for example.

The sensor signal for activating and deactivating the motorized drive unit may for example be received via a user input on a corresponding user interface. Further, the sensor signal may be received as a kind of user input indicative of a user attempt to open and close the door. Here, force sensors may be provided and configured for detecting at least one of an opening and closing force in connection with the door. Such a detected opening and closing force may be used as a trigger for activating the motorized drive unit according to an opening and closing movement. In case that the motorized drive unit is directly coupled to the rack or carrier without being kinematically coupled to the door, the force sensor may be configured for detecting at least one of an extraction and retraction movement, i.e. an action of the user, at the rack and in response to the detection, the motorized drive unit may be instructed by the control unit to move the rack or carrier in accordance with the detected extraction and retraction movement, i.e. user action or intent.

In embodiments, at least one of the motorized drive unit and control unit may be configured such that at least one of an opening and closing movement of the door and/or one of an extraction and retraction movement of the rack and/or carrier are carried out automatically, for example after a particular operating mode of the appliance, such as a cooking process of a cooking oven or a cleaning cycle of a dishwasher etc. The appliance, in particular a user interface and/or the control unit may be configured for being operable, in particular controllable and/or programmable, such that the user is enabled to set or program the appliance in connection with an automated opening after the particular operating mode. Further, the appliance may be configured, e.g. by a corresponding setting in the control unit, such that the door is closed and/or the rack is retracted upon receiving a start signal from a user for starting an operational cycle, such as for example a cooking process or cleaning cycle.

In embodiments, opening and closing movements of the door, in particular automated opening and closing movements of the door, may be associated with a user-perceptible signal, such as one of an audio, visual and or haptic sign. This, in particular in connection with an (additional and optional) emergency stop switch, may preferably be provided in connection with automated opening and closing of the door.

In embodiments, the sensor unit is provided in connection with at least one of a user interface of the appliance, a door handle of the appliance, a door hinge assembly of the appliance, an application configured for execution by a remote device adapted for communicating sensor signals to the appliance for activating and/or deactivating the motorized drive unit. The remote device may for example be a mobile device, such as a mobile phone device and/or a remote-control device.

In embodiments, the appliance comprises a safety control unit adapted for stopping or reversing the operation of the motorized drive unit in response to a cancellation signal received via a corresponding sensor during the operation of the motorized drive unit. The safety control unit may be configured for detecting, for example via the sensor, a hazardous condition, and to generate a corresponding signal for stopping and/or reversing the operation of the motorized drive unit.

In embodiments, the cancellation signal is indicative of at least one of: an abnormal operating condition of the motorized drive unit and a user input action for stopping and/or reversing the motorized drive unit, such for example an override input of the user. An abnormal operating condition may for example correspond to a situation in which the door hits or abuts against an obstacle. Further, such a cancellation signal may be based on a user input indicative of a user intent for stopping the operation of the motorized drive unit. Such cancellation signals may be of advantage for example in connection with configurations allowing automated opening and closing actions of the door, and/or automated extraction and retraction movements of the rack and/or carrier.

In embodiments, the safety control unit comprises at least one safety control sensor unit for detecting the abnormal operating condition and/or the user input action. The safety control sensor unit comprises at least one safety sensor for sensing the abnormal operational condition and/or the user input action. The at least one safety control sensor may be selected from the group comprising a touch sensitive sensor, an acoustically sensitive sensor, a gesture sensitive sensor, respectively responsive to user input actions, and a power consumption sensor, in particular a current sensor, for sensing the power consumption of the motorized drive unit in operation.

For example, if the door hits an obstacle, a current sensor may detect an increase in the current consumed by the motor. Such an increase in the current may be interpreted by a corresponding control unit as an abnormal operational condition. For example, if it is detected, after an initial starting phase of the motorized drive unit, in particular a corresponding motor, that the sensed current increases and exceeds a predetermined threshold, the motorized drive unit may be stopped, and, in embodiments, a corresponding warning signal for perception by the user may be generated.

In embodiments, the appliance comprises a coupling control unit cooperating with the one or more kinematic coupling units of the kinematic coupling mechanism. The coupling control unit is operable in different operational modes for selectively establishing, suspending and/or modifying at least one of a kinematic coupling between the motorized drive unit and the rack, a kinematic coupling between the motorized drive unit and the door, and a kinematic coupling between the door and the rack. Such a coupling control unit may comprise a mechanical element enabling the user to set or suspend, in particular to engage or disengage a kinematic coupling, for example via a mechanical user action. In embodiments, the coupling control unit may be implemented as electronically controllable actuators enabling a user, by corresponding selections or command settings on a user interface, to set or suspend a kinematic coupling by the action of one or more actuators in response to the user selection or user setting.

Setting or suspending a kinematic coupling may, as already indicated, be provided in that the appliance comprises a setting unit enabling a user to set one of the different operational modes of the coupling control unit. The setting unit may be one of mechanical, electro-mechanical and/or electro-magnetic enabling a user to set or suspend the kinematic coupling manually or via a user input or command on a user interface.

Providing such a coupling control may further improve operability. For example, the user may desire in one operational action to selectively open the door, whereas he may desire in a subsequent operational action to extract the carrier from the cavity. Thus, in the one operational action, he may suspend the kinematic chain in which opening the door is associated with an extraction movement of the rack. In the other operational action, the user may set the kinematic chain such that opening the door is associated with an extraction movement of the carrier. Other suitable combinations of setting kinematic chains by means of coupling control units may be contemplated.

In embodiments, the cavity, the rack and/or carrier are specially adapted to further simplify handling and operation of the appliance in connection with extracting and retracting carriers, for example.

In particular, in embodiments, the cavity interior defines in a depth dimension from the front opening to the back wall a maximum depth dimension for the accommodation of the carriers. The rack has a depth extension, measured parallel to a depth dimension of the cavity, that is smaller than the maximum depth dimension. The depth extension of the rack may in particular be substantially smaller than the maximum depth dimension, in particular 10% to 50% or 20% to 30% of the maximum depth dimension ($D_{max}$). In such embodiments, the kinematic coupling mechanism and depth extension of the rack are configured such that in at least one operational mode the rack is fully positioned within the cavity in the door closed position, and the rack at most partially projects out of the front opening in the door fully opened position. Using such depth extensions may be advantageous for reducing the forces or torques needed for extraction and retraction movements.

The "depth dimension" in particular relates to the dimension of the cavity from the front opening to the back wall, i.e. from front to back. In connection with appliances having vertical back walls and front openings with regard to the ordinary orientation of use, the depth dimension may relate to the horizontal extension of the cavity from front to back. The depth dimension in particular may refer to the dimension of the cavity measured in horizontal direction parallel to extraction and retraction movements of a carrier enabled and defined by the carrier supports and/or rack.

The maximum depth dimension for the accommodation of carriers shall in particular relate to and define the maximum size or dimension of carriers that can reasonably and under ordinary operating conditions be put into the cavity with regard to the extension from front to back. For example, the exact dimension of the cavity in depth dimension is ordinarily slightly larger than the maximum size of carriers that can be used in ordinary operation such that a smooth insertion and placement of the carriers within the cavity is possible, without impeding proper closure of the door and without causing damages to the inner cavity walls upon closing the door.

In such embodiments, the door and the rack and/or carrier may be kinematically coupled by a kinematic chain by one or more kinematic coupling units, such for example one single kinematic coupling unit, e.g. a coupling member such as a coupling rod or coupling bar. The expression "at least partially projects out of the front opening" shall mean, that in the opened position of the door, if the kinematic coupling is active, the rack, more particularly a front edge of the rack facing the front opening in the retracted position, is located within the cavity, in the region of the front opening, or, at most partially, projects to a certain extent out of the front opening. By this, placing a carrier on the rack and removing a carrier from the rack may be simplified for the user. This configuration in particular provides the advantage of assisting the user in extracting and retracting, e.g. in removing and inputting, carriers, such as trays or grids, into the cavity. Further, implementing the components such that the rack at most partially projects out of the front opening may be advantageous for avoiding interferences with user activities performed in the region of or near the front opening. Yet further, keeping the rack as a whole or substantially within the cavity may be advantageous in connection with cooking appliances, because after cooking processes the rack may be hot, thereby avoiding burn injuries.

The expression "at most partially projects out of the front opening" shall mean, that the rack remains within the cavity or that at most a part, in particular a frontal part or section, of the rack projects out of the cavity in the opened position of the door. The frontal part or section of the rack shall mean a part or section of the rack that is close to the viewer when viewed in a plan view of the front opening.

In embodiments, the kinematic coupling, and in particular the depth extension of the rack, may be configured and arranged such that the rack completely remains within the cavity also in the fully opened position of the door. Remaining within the cavity may for example involve that the frontal part or section, in particular the frontal side or frontal edge, of the rack, e.g. the side or edge averted from the back wall of the cavity, remains behind, lies within, or reaches the opening area of the front opening in depth direction in the fully opened position of the door. The "fully opened position" of the door shall refer to the opened position of the door, in which the door cannot be opened further under ordinary use conditions. Further, and based on the kinematic coupling mediated by the one or more kinematic coupling units, the "fully opened position" corresponds to the foremost position of the rack as mediated by the kinematic coupling, i.e. the position farthest away from the back wall. The closed position of the door shall correspond to the rearmost position of the rack as mediated by the kinematic coupling, i.e. the position closest to the back wall.

In embodiments, at least one of the one or more kinematic coupling units comprises a coupling member that is coupled by a first pivot mount at one end to a frontal section of the rack and by a second pivot mount at the other end of the coupling member to an inner section, in particular sheet, of the door. In such embodiments, the rack may comprise at the frontal section at least one cantilevering element having a free end with a complementary pivot mount for pivotally mounting one of the pivot mounts of the kinematic coupling unit. The cantilevering element may project at the frontal side or edge of the rack parallel to or perpendicular to the depth dimension of the cavity. Further, the cantilevering element may have a triangular design with two legs extending between a frontal section, in particular a frontal side of a bar, of the rack and the complementary pivot mount. Further, the cantilevering element, in particular the legs, may be adapted to fix the complementary pivot mount at a predefined distance from a frontal attachment site of the cantilevering element at a frontal section or side of the rack.

In a triangular design of the cantilevering element, the cantilevering element may comprise two legs extending between a frontal section, in particular frontal side or edge, of a, e.g. horizontal or vertical, bar of the rack and a complementary pivot mount. The cantilevering element, in particular the legs, may be configured and arranged such that the cantilevering element, in particular the legs, fix the complementary pivot mount at a predefined distance from a frontal attachment site of the cantilevering element, for example a predefined distance from a frontal section, in particular a frontal side or frontal edge for example a frontal bar, of the rack to which the cantilevering element is fixed or from which the cantilevering element extends.

Such designs involving cantilevering elements may provide further advantages with regard to obtaining advantageous positions of the rack and carrier in connection with placing and removing a carrier from the rack. Further, using one or more of such cantilevering elements may be advantageous in connection adapting the kinematic coupling between the motorized drive unit on the one side and the rack on the other side to different geometric configurations and different ranges for moving the rack out of the cavity. Further, such cantilevering elements may ease the process of pivotally coupling, in particular mounting, the coupling member to the rack.

In embodiments, the appliance further comprises at least one damping mechanism or damping element for damping movements mediated by the kinematic coupling mechanism between the rack, the carrier, the door, and/or the motorized drive unit. The damping element may for example be a bumper or similar provided at end stops of respective moving elements such as the rack, the carrier, and/or the door.

A damping mechanism may in embodiments also be implemented in form of control routine on a control unit for controlling the operation of the motorized drive unit. For example, the control routine may, when executed by the control unit, slow down, in particular gently decelerate, the movement near the end position of the rack, carrier and/or door thereby avoiding hard end stops of respective movable components such as the rack, the carrier, and/or the door.

As mentioned, such damping mechanisms may avoid hard stops in final positions of the movable components. Such damping elements or damping mechanisms may for example be of advantage if liquids in open vessels or other objects that are sensitive to hard stops are placed on a carrier. Final positions of the rack, carrier and/or door or reaching such positions may be sensed by suitable sensors provided with the appliance in connection with the rack, carrier, and/or door.

In embodiments, at least one of the kinematic coupling units, which may be implemented as a coupling member such as a coupling rod, coupling bar or wire frame, for example, provides a kinematic coupling between the rack and the door. The kinematic coupling may for example be a direct kinematic coupling in which the door and rack are directly attached to the coupling member. In such embodiments, the kinematic coupling unit, i.e., the kinematic coupling member, may be pivotally attached, in particular at one end thereof, to the rack. The other end thereof may be attached to the door. The coupling member may be curved or bent with reference to a plane of curvature or plane of bent. The plane of curvature or plane of bent, respectively, are preferably parallel to the pivoting plane of the kinematic coupling unit, i.e. the kinematic coupling member. Such kinematic coupling units may be advantageous in that a kinematic mechanical coupling between respective components may be provided in a comparative easy and reliable way. Further, providing coupling units with curvature or bent may avoid interferences with user actions at the front opening. Yet further such curvatures or bents may be advantageous for obtaining suitable force transmission between the movable components, in particular in dependence of respectively actual positions of the movable components.

The curvature or bent of one or more kinematic coupling units, in particular coupling members, may be associated with substantially a single radius of curvature or radius of bent, or may be associated with a plurality of radii of curvature or radii of bent varying lengthwise along the coupling member. The curvatures may be selected to obtain optimal force and torque transmissions between the movable components, in particular with the motorized drive unit.

In embodiments, the coupling member may comprise at least one region with a single type of curvature or a single type of bent, with a corresponding center or centers of curvature or center(s) of bent lying on a side of the coupling member facing away from a hinge or pivot axis of the door.

The type of curvature or bent may be concave or convex when viewed in lengthwise direction of the coupling member. In particular, the coupling member may have an arched shape, for example of concave or convex type, in which the coupling member in the ordinary mounted position is bulged, i.e. curved, towards the hinge axis of the door.

In embodiments, at least one region with a single type of curvature or single type of bent is located closer to the pivot mount of the coupling member associated with the door than to the pivot mount of the coupling member associated with the rack. Such a design may for example be advantageous with regard to the avoidance of interferences with user actions near or in front of the front opening in the opened position of the door, as well as with transmission of forces and torques within a kinematic chain.

In embodiments, the coupling member may comprise at least two regions with different types of curvature or bent. In embodiments, the coupling member may comprise a shape including multiple types of bents or curvatures. For example, the coupling member may comprise in lengthwise direction thereof at least one region with a concave type of curvature or bent, and at least region with a convex type of curvature or bent.

Corresponding centers of curvature or centers of bent may lie in the pivoting plane of the kinematic coupling unit, in particular a coupling member. The plane of curvature or plane of bent may be parallel to the pivoting plane of the coupling member.

In embodiments, a first center or first centers of curvature or bent of a first region with a first type of curvature or bent may lie on a side of the coupling member facing away from the hinge or pivot axis of the door. A second center or second centers of curvature or bent of a second region with a second type of curvature or bent may lie on a side of the coupling member facing towards the hinge or pivot axis of the door.

In embodiments, the first region may be located closer to the pivot mount of the coupling member associated with the door than to the pivot mount of the kinematic coupling unit associated with the rack. Further, in embodiments, the second region may be located closer to the pivot mount of the kinematic coupling unit associated with the rack than to the pivot mount associated with the door. Preferably, the first region is associated with a smaller radius or radii of curvature than the second region. In embodiments, the first region may be convex and the second region may be concave with regard to the ordinary mounting position and the ordinary operating orientation of the appliance, when viewed in lengthwise direction of the kinematic coupling unit.

Providing the first and second regions with different types of curvatures or bents in in accordance with the aforementioned embodiments may provide advantages with regard to optimal kinematic coupling, in particular force transmission, between the door and the rack in connection with inserting and extracting carriers, i.e. in connection with extraction and retraction movements, upon closing and opening movements of the door. Further, such embodiments may be advantageous for avoiding interferences between the coupling member and possible user actions during use of the appliance in the door opened state.

In embodiments, at least one of the kinematic coupling units, for example a coupling member, may be implemented as a wire frame. The kinematic coupling unit may comprise, for example at least in between two pivot mounts, a double wire section. The double wire section may comprise for example a pair of substantially parallel wires. Such a coupling member may have advantages with regard to lightweight construction, yet providing sufficient mechanical strength for use in connection with a motorized drive unit.

In embodiments, the rack comprises at least one rack unit. The rack unit may be at least one of a wire rack and/or plate-like rack element. The rack unit, in particular the wire rack or plate-like rack element may be movably associated with the interior of the cavity, in particular with one inner lateral side wall of the cavity extending between the back wall and the front opening. In particular, the rack unit may be movably coupled to or at the inner lateral wall, for example by means of a rail and/or sliding mechanism. The rack unit may in particular be movable parallel to the depth dimension of the cavity, preferably parallel to the respective lateral side wall. As such, the rack may be movably associated with the cavity interior such that the rack is movable in an extraction and retraction movement. Rail and/or sliding mechanisms have been proven suitable for use in connection with kinematic drive units, for example enabling an automated movement of the rack.

In embodiments, the rack comprises at least one support for supporting, within the cavity, at least one carrier, such as a tray or grid. Preferably, the rack comprises two or more supports for supporting carriers at different height levels within the cavity. According to the ordinary use condition, the height levels may refer to different levels in vertical direction.

The rack may for example be implemented as or comprise a wire grid assembly with one or more vertical bars and one or more horizontal bars supporting the vertical bars. The vertical bars are configured for accommodating and supporting the carriers, for example at lateral edges of thereof.

Other implementations of a rack are possible, such sheets and plates, for example made at least in part from one of metal, glass, and one or more suitable plastic materials. In such embodiments, the supports may be implemented as grooves and/or strips obtained for example by bending, folding, forming, welding, additive manufacturing and/or machining such as milling and the like.

The rack may comprise one or more support structures, in particular support frames. A support structure or support frame may be configured for being placed along, in particular parallel to, one of the lateral side walls extending between the back wall and the front opening.

In embodiments, the rack may comprise two support structures or support frames configured for placement along and in parallel to the opposite lateral side walls extending between the back wall and the front opening of the cavity. In such embodiments, the rack may be configured such that in the ordinary position within the cavity, each support structure or support frame is placed along one of the two opposite lateral side walls. Preferably, such support structure or support frame, or in general the rack, may comprise one or more, in particular several, support levels for placing carriers at different levels, i.e. support levels, in vertical direction, in particular height levels, within the cavity. Support structures of this kind may be configured for engaging the edges of a carrier, running, when positioned in the cavity, in horizontal direction and parallel to the lateral side walls of the cavity.

In embodiments, the rack may comprise a support structure that is arranged parallel to the back wall and configured for engaging carriers, such as trays or grids, at a rear side or rear edge thereof with regard to the carrier positioned in the cavity.

If the rack comprises for example several, i.e. two or more, support structures or support frames, they may be interconnected, for example at a lower side thereof, at an upper side thereof, and/or at a front or back side thereof, wherein the terms lower, upper, back, and front relate to the ordinary condition of use of the appliance, in which the front opening and/or a door closing the front opening is associated with the front side of the appliance. If an interconnection between support structures or frames is present, the motorized drive unit may in embodiments kinematically coupled to the interconnection. Thus, a driving force generated by the motorized drive unit can be transmitted to the interconnection, in turn driving the support structures or support frames accordingly, e.g. in an extraction and retraction movement.

Further, based on an interconnection of two or more support structures or support frames, the support structures or support frames may be kinematically linked or coupled such that they can be handled, in particular moved or displaced, together, in particular in a synchronized manner. This may be of advantage for establishing a kinematic coupling with the motorized drive unit. Yet further, such interconnections provide mechanical stabilization with regard to the placement and position relative to the inner side of the walls of the cavity.

In embodiments, a rack may comprise a single support structure or a single support frame. The single support structure or frame may be configured and arranged for placement parallel to the back wall of the cavity or parallel to a lateral side wall extending between the back wall and the front opening of the cavity. In such embodiments, supports, i.e. the carrier supports, and corresponding carrier holders or carrier mounts may be configured for supporting or holding a carrier at a back side thereof, i.e. rear side, facing the back wall of the cavity, or at a lateral side thereof facing one of the two lateral walls of the cavity with regard to the ordinary placement of the carrier within the cavity. In other embodiments, the appliance comprises two support structures or two support frames, arranged symmetrically within the cavity, for example at or along the lateral side walls extending between the back wall and the front opening of the cavity. In embodiments, each support structure may be associated with a driven component associated with one or more motorized drive units.

In embodiments, one or more of the kinematic coupling units, e.g. one or more coupling members may be implemented as an elongate coupling elements, such as a bars, rods, or a bar-like or rod-like elements, or they may comprise one or more of such components. As such, the kinematic coupling unit may be, with regard to shape, an elongate coupling member. For example, the kinematic coupling unit may comprise one or more, e.g. two, bars or rods extending in lengthwise direction of the coupling member. The bars or rods may be interconnected for example by one or more cross bars, rods or similar elements for stabilising the coupling member against transversal bending or deformation.

In embodiments, pivot mounts for attachment to the movable components and/or the motorized drive unit, in particular at least one of them, may be relocatably arranged or positioned with regard to the lengthwise extension thereof. For example, the pivot mount may be movably, in particular slidably, coupled to a coupling member, e.g., a rod or bar thereof, such that it can be positioned at different locations in lengthwise direction. A locking mechanism may be provided for locking the pivot mount at the different locations. By providing such a movable pivot mounts, the kinematic movements mediated by a corresponding kinematic coupling unit may be adapted by relocating the pivot mount.

The pivot mounts may for example be pivoted at the rack, the carrier, the door, and the motorized drive unit, respectively.

The pivot mounts may comprise pivot mounting sections adapted for being pivotally coupled to complementary pivot mounts respective components, e.g., the rack, the carrier, the door and the motorized drive unit.

In embodiments, one of the pivot mounts may be pivoted, in particular hinged or articulated, at one of the movable components, such as the rack, the carrier, the door, and the motorized drive unit, and the another one of the pivot mounts may be pivoted, in particular hinged or articulated, the other component kinematically coupled by means of a corresponding kinematic coupling unit to the movable component. In particular embodiments, the pivot mounts may be directly pivoted, in particular hinged or articulated at respective components, for example by means of corresponding complementary pivot mounts provided at the respective other kinematically coupled component.

In embodiments, the kinematic coupling unit, such as a kinematic coupling member, may be pivoted and may provide a kinematic coupling such that a pivoting opening and closing movement of the door is translated into an extraction and retraction movement of the rack and/or carrier in depth dimension by the action of one or more kinematic coupling units and the motorized drive unit as well as via the pivot mounts. As such, a pivoting opening or closing movement of the door, for example caused by the action of the motorized drive unit, may be translated to a forth and back movement of the rack and/or carrier, i.e. a movement away from the back wall and a movement towards the back wall of the cavity. The movement away from the back wall may be associated with an extraction or outward movement, and the movement towards the back wall may be associated with a retraction or inward movement.

The movement of the rack and/or carrier may be a linear movement parallel to the depth dimension of the cavity, for example in substantially horizontal direction.

In embodiments, at least one of the pivot mounts of at least one of the kinematic coupling units may comprise a loop section, in particular a wire loop, defining a first pivot member. The loop section may positively engage a groove of a second pivot member. The second pivot member may for example be associated with the rack, in particular with the cantilevering element, the carrier, or the door. A pivot axis of the kinematic coupling unit may in such embodiments be perpendicular to the plane defined by the area of the loop section. The area of the loop section may by parallel to the pivoting plane of the kinematic coupling unit. Such loop-like couplings on the one hand provide easy and low maintenance joints, and also enable low friction joints which is considered advantageous for reducing the overall mechanical loads for the motorized drive unit.

The second pivot member may for example be implemented as a sphere, ball, or disc with an annular groove provided for engagement with the loop section. For example, an outer circumference of the groove may by in contact with an inner circumference of the loop section. The second pivot member may be associated, for example with the rack, in particular with the cantilevering element.

In embodiments, the loop section may comprise a necking or constriction such that the loop section engages around and positively interacts with the groove of the second pivot member and/or the second pivot member. Providing respective neckings or constrictions may be used to couple the loop section pivotally to the second pivot member, for example, without requiring further fixing elements, such as screws, between the loop section and the second pivot member to avoid relative movements between the loop section and the second pivot member in lengthwise direction of the coupling member.

In embodiments, at least one of a pivot mount of at least one of the kinematic coupling units may comprise a hinge joint. A section of the kinematic coupling unit may constitute a hinge pin of the hinge joint. For example, the hinge pin may be implemented by an angled section of a wire or rod of the coupling member implemented for example as a wire frame or wire grid.

A corresponding counterpart of the hinge joint, i.e. a complementary hinge joint may be provided and configured for being hingedly coupled with the hinge joint. The complementary hinge joint may for example be implemented as or comprising at least bent lug or tongue or hinge projection. Such a lug or tongue or hinge projection may for example be provided on an inner wall, in particular an inner sheet, of the door, for example as a free-cut, in particular bent tab or tongue or a hinge projection provided at or on the inner wall of the door to project from the inner wall and to form a mount, in particular an arched mount or socket, for the hinge pin. The complementary hinge joint may in alternatives be fastened by means of a screwed and/or adhesive connection, for example on or at a plate or sheet of a component to which the kinematic coupling unit is to be fastened by means of the complementary hinge joint. A screw connection may involve a through hole provided in a corresponding plate or sheet. A screw may pass through the through hole and be fixed on the side averted from the complementary hinge joint by a nut. The screw may in alternatives also be fastened based on an internal thread provided in the through hole. By this, the complementary hinge joint may easily be mounted to a corresponding component, for example to the door, in particular a sheet of the door, and/or a rack element, in particular a plate of a plate-like rack element, for example.

In particular, the joint between a kinematic coupling unit and the rack or carrier, between a kinematic coupling unit and the door and/or between a kinematic coupling unit and the motorized drive unit may be configured to be disconnectable and reconnectable again. This configuration may be implemented such that the user can manually disconnect and reconnect one or more of the kinematic coupling units according to the user's needs. Further the disconnectable and reconnectable kinematic couplings may be associated with a connection unit configured to be operated by an actuator of the appliance to disconnect or reconnect the kinematic coupling, for example in response to a user selection, for example on a user interface, in response to a determination of the appliance, based for example on one or more sensor signals, that one or more of the kinematic couplings are to be disconnected or reconnected, and/or based on a preprogramed setting provided for example in connecting with different operational modes. The connection unit may for example be instructed or intractable to disconnect or reconnect the kinematic coupling in case of an abnormal operational condition based on one or more corresponding sensor signals, or based on particular operational conditions, for example in accordance with specific operational programs or operational cycles executed by the appliance.

In embodiments, at least one of the kinematic coupling units may be pivoted at the door based on the hinge pin engaging a corresponding socket formed at or attached to an inner wall, in particular an inner sheet, of the door. The socket may for example be implemented as an arched free-cut tab, or as a bearing projection provided, in particular attached by means of a screwed or adhesive bond, at or on the inner wall or sheet of the door.

In embodiments, the cavity may comprise two lateral side walls extending between the back wall and the front opening parallel to the depth dimension. In particular, one or more parts of the rack, in particular the rack unit(s), wire rack(s), or plate-like rack elements, may be positioned parallel to at least one of the lateral side walls. The rack may comprise at least one shoulder projecting inwardly to the cavity interior and/or an abutting face. The term "inwardly" shall refer to the ordinary mounting position of the rack. The shoulder and/or abutting surface may be implemented to rest on an upper side of a component of a runner, such as for example a telescopic runner that is movable in-depth dimension of the cavity. The runner may be part of a guiding unit, such as a telescopic runner, provided within the cavity and defining the movement path for the rack for extraction and retraction movements. The guiding unit may be mounted to an inner wall of the cavity and may, in embodiments, at least in part, be integrally designed with a section of an inner wall, such as for example an inner lateral side wall. By means of such shoulders and abutting surfaces, the rack, in particular rack unit can be moved within the cavity based on the movable mount of the runner, for example in connection with the guiding unit, without requiring excessive driving forces. The runner may be a movably member of the guiding unit and configured to be movable along the guiding unit. In the proper mounted state of the guiding unit in the cavity, the runner may be movable back and forth in-depth dimension, thereby enabling extraction and retraction movements of the rack supported by the runner.

The rack, in particular the rack unit, in particular the wire rack or plate-like rack element, may comprise an attachment section extending from the shoulder or abutting surface. The attachment section may be configured to engage a tab, tongue, lug, groove, or recess. The tab, tongue, lug, groove, or recess may be provided at and defined on the runner, may be u-shaped that opens horizontally or vertically, and may be configured for accommodating the attachment section. By this, the rack may easily be mounted in the cavity interior at and movable along a corresponding lateral side wall, for example, even though the rack is to be kinematically coupled with the door and/or motorized drive unit.

In particular embodiments, the rack unit, in particular the wire rack or plate-like rack element, may be movably attached to or associated with the inner lateral side wall of the cavity by means of rollers engaging corresponding rails provided at or on the inner lateral side wall of the cavity. The rail may be profiled in its cross section, in particular C-shaped, such that the rollers can engage the rail for guided movements along the rail. The rollers and guide may be considered as a particular implementation of a guiding unit.

In embodiments, a fulcrum defined between at least one of the kinematic coupling units and the rack may be located in un upper third or a lower third or approximately in the middle relative to the, in particular vertical, height of the rack measured perpendicular to the depth dimension and parallel to the area of the front opening, in particular parallel to the lateral side walls of the cavity.

In embodiments, a fulcrum defined between at least one of the kinematic coupling units and the door may be located, with regard to the door closed position, in a lower third relative to the height of the font opening measured perpendicular to the depth dimension and parallel to the area of the front opening.

Such arrangements of the fulcrum may be advantageous with regard to obtaining suitable kinematic couplings, for example in embodiments in which the rack remains substantially within or fully within the cavity in the fully opened position of the door. Further, such embodiments may be advantageous for obtaining suitable transmission with regard to torque. In particular, such positions may be advantageous for obtaining low driving forces for moving the door and/or rack and/or carrier by means of the motorized drive unit.

As can be seen, the appliance as suggested in accordance with the invention provides improved user assistance and support in connection with operating and handling the appliance.

BRIEF DESCRIPTION OF THE SEVERAL VIEWS OF THE DRAWINGS

Further advantages features and details of the various embodiments of this disclosure will become apparatus from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

The present invention will be described in further detail with reference to the drawings, wherein.

DETAILED DESCRIPTION OF THE INVENTION

Figure 1:
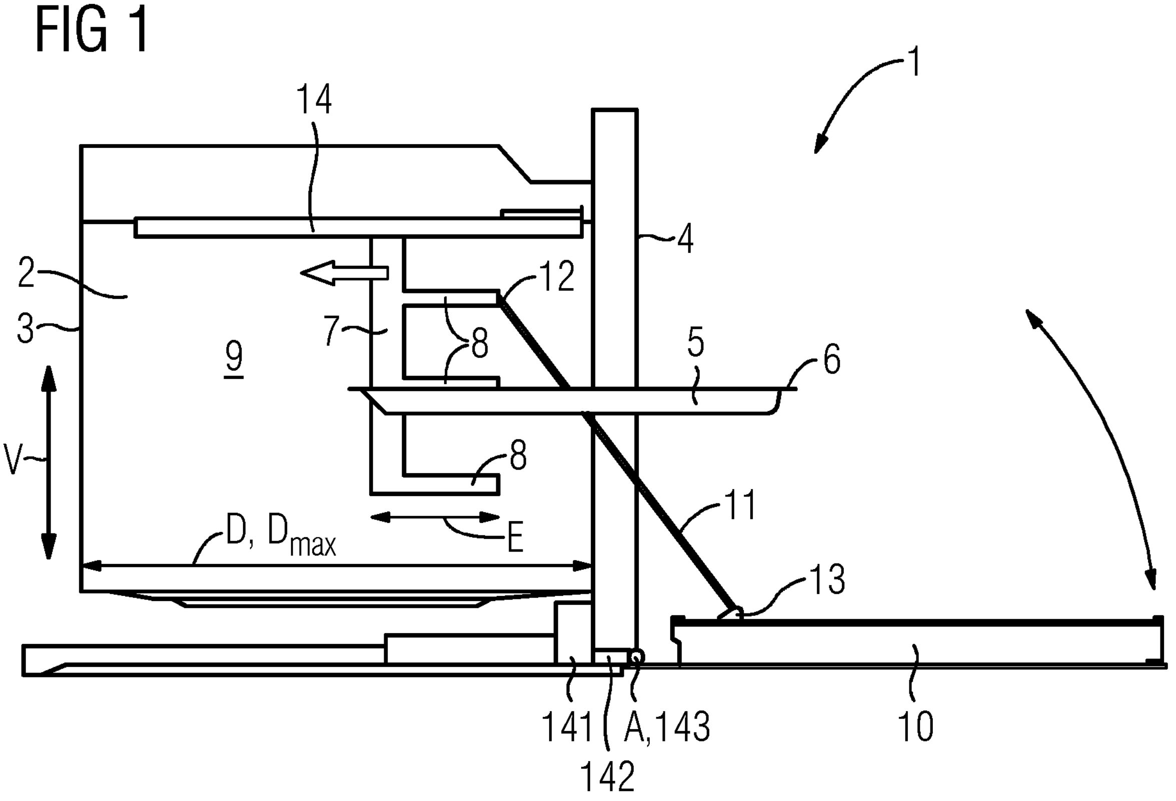
FIG. 1 illustrates a schematic representation of a side view of a baking oven implemented according to an embodiment of the invention.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirely of the following list and do not necessarily modify each member of the list, such that "at least one of "A, B, and C" should be understood as including only one of A, only one of B, only one of C, or any combination of A, B, and C.

Component parts having the same or a similar function may be depicted in different embodiments shown in the figures with the same reference numerals, despite the design and/or shape of such elements may be different. Further, respective component parts may be interchanged with regard to different embodiments at least in so far as retracting and extracting movements of the rack and/or carriers supported by the rack are concerned.

FIG. 1 illustrates a schematic representation of a side view of an exemplary baking oven 1 implemented as an appliance according to an embodiment of the invention.

The baking oven 1 comprises a cavity 2 comprising a back wall 3 and an opposite front opening 4. The cavity is configured for accommodating therein trays 5, or more general carriers 5, through the front opening 4. The cavity 2 defines in depth dimension D from the front opening 4 to the back wall 3 a maximum depth dimension $D_{max}$ for the accommodation of the trays 5. In FIG. 1, the tray 5 is not fully accommodated within the cavity 2. Specifically, a frontal edge 6 of the tray 5 projects out of the cavity 2, wherein the tray 5 as such projects through the front opening 4.

In the configuration shown in FIG. 1, the user may remove the tray 5 from the baking oven 1, or he may have placed the tray 5 on a tray rack 7, or more generally on a rack 7, for inserting the tray 5 into the cavity 2. For the reason that the frontal end 6 of the tray 5 projects out of the cavity 2 and is freely accessible for being grasped by a user in the region of the frontal end 6, the user may easily handle the tray 5 in connection with removing the tray 5 after an extraction movement of the tray rack 7, or in connection with placing the tray on the tray rack 7 before a retracting movement of the tray rack 7.

The tray rack 7 of the baking oven 1 comprises several, i.e. in the present embodiment three, tray supports 8, or more general carrier supports, for accommodating and supporting a tray 5 as shown with the middle tray support 8 in FIG. 1. The tray supports 8 are provided such that the tray 5 can be placed at different levels in vertical direction V. The term vertical direction in particular shall relate to the ordinary placement and operating condition of the baking oven 1.

As indicated in FIG. 1 by means of a double lined arrow, the tray rack 7 is movably mounted within the cavity interior 9. As can easily be seen from FIG. 1, the tray rack 7 has a depth extension E, measured parallel to depth dimension D of the cavity 2, that is smaller than the maximum depth dimension $D_{max}$. In the present embodiment, the depth extension E of the tray rack 7 is substantially smaller than the maximum depth dimension $D_{max}$. In particular, the depth extension E is between 10% to 50%, more particularly between 20% to 30% of the maximum depth dimension $D_{max}$.

The baking oven 1 comprises a door 10 that is hinged to a body or frame of the baking oven 1, with a hinge axis A running in horizontal direction. The door 10 is provided for opening and closing the front opening 4. In particular, the door 10 is for closing the cavity 2 in the closed position of the door 10 as illustrated in FIG. 2, and for enabling access to the cavity interior 9 in the fully opened position of the door 10 as illustrated in FIG. 1.

The baking oven 1 further comprises a coupling member 11 that is implemented and arranged to provide a kinematic coupling between the tray rack 7 and the door 10. The coupling member 11 may be substantially rigid with regard transversal bandings relative to the lengthwise extension. The coupling member 11 represents a kinematic coupling unit of a kinematic coupling mechanism of the oven which has been described in further detail above and will be described also further below.

The coupling member 11 comprises pivot mounts spaced in lengthwise direction of the coupling member 11. In the given embodiment, the coupling member 11 comprises a first pivot mount 12 and a second pivot mount 13. The first pivot mount 12 of the coupling member 11 is pivoted at the tray rack 7. The second pivot mount 13 is pivoted at the door 10 by means of suitable pivot connections.

Figure 2:
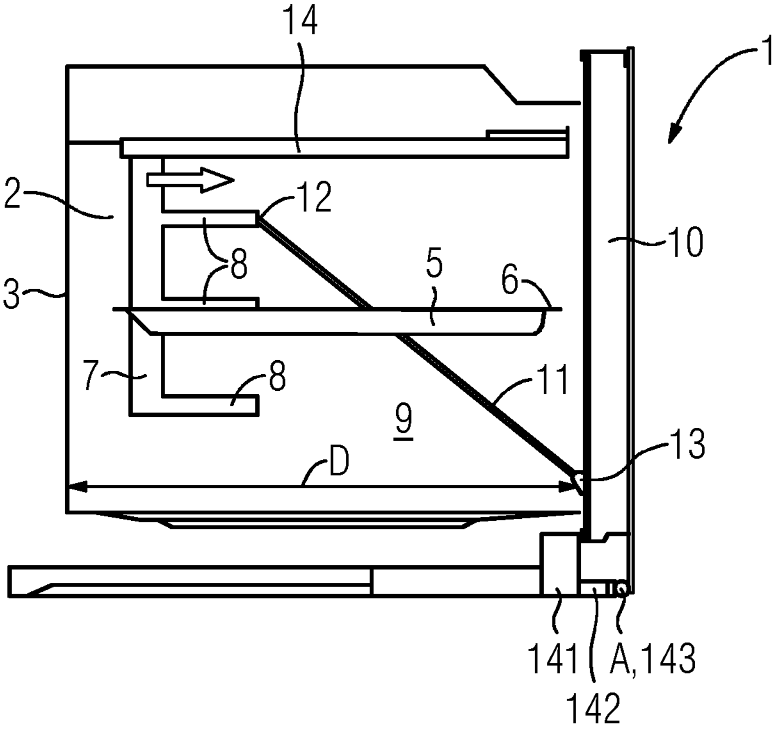
FIG. 2 illustrates the baking oven of FIG. 1 in the closed position of the door.

The coupling member 11, the first and second pivot mounts 12, 13, and the pivot connections that pivotally interconnect the coupling member 11 with the door 10 and tray rack 7, respectively, are configured such that a pivoting movement of the door 10, which is indicated by an arched double arrow in FIG. 1, is translated into a movement of the tray rack 7 in depth dimension D of the cavity (see double lined arrows in FIG. 1 and FIG. 2). The movements in depth dimension D may be referred to as extraction movements associated with opening movements of the door 10, and retraction movements associated with closing movements of the door 10.

Specifically, the kinematic coupling mediated by the coupling member 11, and the depth extension E of the tray rack 7 are configured such that the tray rack 7 at most partially projects out of the front opening 4 in the fully opened position of the door 10, which is illustrated in FIG. 2.

The expression "at most partially" shall mean that the tray rack 7 may at most extends to a certain degree out of the cavity. This term thus covers configurations of the cavity, tray rack 7, and the coupling member 11, in which the tray rack 7 remains within the cavity 2 in the door fully opened position, is positioned at the front opening with a frontal edge being positioned in the region of the front opening 4 in the door fully opened position, and in which the tray rack 7 projects to a certain extent out of the cavity 2 in the door fully opened position. Projecting out of the cavity 2 to a certain extent preferably covers configurations of associated component parts of the appliance 1 in which a major part of the tray rack 7, in particular in which at least about 50% to about 90%, preferably about 75% to about 90% of the tray rack 7 when viewed in depth dimension D of the cavity 2, remain within the cavity 2.

Further, the kinematic coupling mediated by the coupling member 11 and the depth extension E of the tray rack 7 is configured such the tray rack 7 is fully positioned within the cavity 2 in the closed position of the door 10, which is illustrated in FIG. 2. In this FIG. 2, the door 10 is in the closed position, and the tray rack 7 together with the tray 5 have been moved in a retraction movement backwards towards the back wall 3 as compared to the situation in FIG. 1.

As can be inferred from a comparison of FIG. 1 and FIG. 2, the coupling member 11 translates the rotary movement of the door 10 into a linear movement of the tray rack 7. In the closed position of the door 10 according to FIG. 2, the tray rack 7 is positioned in the rearmost position, whereas in the opened position of the door 10 according to FIG. 1, the tray rack 7 is positioned in the foremost position regarding the overall back-and-forth movability of the tray rack 7.

The movability of the tray rack 7 is provided based on a rail 14 representing or comprising a runner or slider for the tray rack 7. The tray rack 7 is coupled to the rail 14 to be movable along the rail 14 in a guided movement. The rail 14 in the present example is provided at an upper section of the cavity 2, in particular in the region of the top wall of the cavity 2. The rail 14 may be mounted or otherwise be provided on an inner side of a vertical lateral side wall of the cavity 2 extending between the back wall 3 and the front opening 4. In embodiments, the rail 14 or other movable attachments provided for the tray rack 7 may be provided at or on an inner lower side of the top wall of the cavity. Other locations are conceivable, such as for example on or at a lower section of the lateral side wall of the cavity 2 and/or on or at the bottom wall of the cavity 2.

The rail 14 or any other type of runner may be implemented as a separate component part attached to the cavity walls, or the rail 14 may at least in part be integrated with the cavity wall or cavity walls.

The baking oven 1 further comprises a motorized drive unit 141, which in the present example comprises as an electric rotary drive motor. In other embodiments, one or more linear motors and/or one or more tube motors and other types of motors may also be envisaged. A tube motor represents a kind or rotary motor, which may be configured for being incorporated into a hinge axis of the door, for example.

The motorized drive unit 141 is provided in a lower section of the casing of the baking oven 1, in the present example below the bottom wall of the cavity 2, and is located in a front section near the location where the door 10 is attached to the casing. The motorized drive unit 141 is drivingly coupled to the door 10 such that operation of the motorized drive unit 141 in one operational mode causes a closing movement of the door 10, and such that in a reversed operational mode it causes an opening movement of the door 10. Specifically, a power output port of the motorized drive unit is, in the given example, coupled via a transmission 142, such as a gear transmission, to a door hinge 143 of the door 10 or to the hinge axis A of the door 10. The transmission 142 is connected at its power output port to the hinge 143 or to the hinge axis A such that a rotary movement of the motorized drive unit 141, specifically the motor thereof, is translated into a rotary movement of the door 10 between the opened position and the closed position, depending on the operation of the motorized drive unit 141.

End switches may be provided for both the fully opened position and the fully closed position of the door 10, such that in response to an activation of one of the end switches the operation of the motorized drive unit 141 is stopped.

If required, for example for the purpose of providing sufficient torque, there may be provided several motors. As an example, each of the door hinges 143 may be coupled with a corresponding motor. The motors may be configured to operate synchronously in connection with opening and closing movements of the door 10.

For the reason that the motorized drive unit 141 is kinematically coupled via the gear transmission 142, which may be considered as a first kinematic coupling unit, to the door 10, and the door 10 in turn is kinematically coupled to the rack 7 via the coupling member 11, which may be considered as a second kinematic coupling unit, the motorized drive unit 141, the door 10, and the rack 7 are kinematically coupled in a kinematic chain.

Via this kinematic chain, an operation of the motorized drive unit 141 involving an opening movement of the door 10 is translated into an extraction movement of the rack 7. Further, an operation of the motorized drive unit 141 involving a closing movement of the door 10 is translated into a retraction movement of the rack 7. Thus, the motorized drive unit 141 and the kinematic chain established with the door 10 and the rack 7 may greatly simplify operation of the cooking oven 1 for the user.

In the given example, a gear transmission 142 has been discussed. However, the motorized drive unit 141, in particular a motor thereof, may be kinematically coupled via other kinds of transmissions, such as for example a belt drive, a chain drive or others.

Further, the motorized drive unit 141, in particular a motor thereof, and a corresponding transmission 142, such as the gear transmission 142, may be positioned in different locations as compared to the given example. For example, a tube motor may be implemented and installed in connection with a tube of the hinge axis A or the door hinge 143. Further, one or more motorized drive units 141 or motors may be provided, with corresponding transmissions or connected to corresponding transmissions, in a section of the appliance lying approximately in the region of the middle of the door 10 with regard to the width of the door 10 measured in parallel to the hinge axis A.

In other embodiments, the motorized drive unit 141 may be kinematically coupled directly to the rack 7, for example via one or more corresponding transmissions, such that an operation of the motorized drive unit 141 is directly translated into an extraction and retraction movement of the rack 7. The motorized drive unit 141 may in this case for example coupled to a slider or runner by which the rack 7 is movably mounted to the cavity 2. If the rack 7 in turn is kinematically coupled to the door 10, the extraction and retraction movements of the rack 7 mediated by the direct kinematic coupling with the motorized drive unit 141 are translated into an opening and closing movement of the door 10. Thus, this kind of kinematic reversal as compared to directly coupling the motorized drive unit 141 to the door 10 has substantially the same effect as described in connection with the embodiments above, provided that the motorized drive unit 141, the rack 7 and the door 10 are coupled, in the given sequence, in a kinematic chain.

In the example shown in FIGS. 1 and 2, the kinematic chain is implemented such that the door 10, the rack 7, and the tray 5 placed on the rack 7 are moved in a synchronized manner in response to an operation of the motorized drive unit 141. In embodiments, it is possible that the start and/or stop of the movements of corresponding components is/are time-shifted. For example, in one embodiment, the opening movement of the door 10 may be ahead the extraction movement of the rack 7, whereas the retraction movement of the rack 7 may be ahead the closing movement of the door 10, for example in that the rack 7 reaches the retracted position before the door 10 reaches the fully closed position. Such shifts in the movements may be obtained by suitable configurations of the kinematic coupling units, e.g. by an end clearance or other measures. However, movements including concurrent movements of the door 10 and rack 7 at least within an overlapping time interval shall still be considered as being synchronized movements, e.g. synchronized with regard to opening and extraction, and synchronized with regard to closing and retraction.

Further, shifts or delays in the movement of the door 10 and the rack 7 may in particular be present if the door 10 and/or rack 7 and/or tray 5 are independently driven by one or more motorized drive units 141 and/or transmissions 142.

Accordingly, in embodiments, two or more of the movable components, such as the door 10, the rack 7, and the tray 5 may be kinematically separately coupled to one or more, in particular separate, motorized drive units 141 via one or more, in particular separate, transmissions 142.

Figure 3:
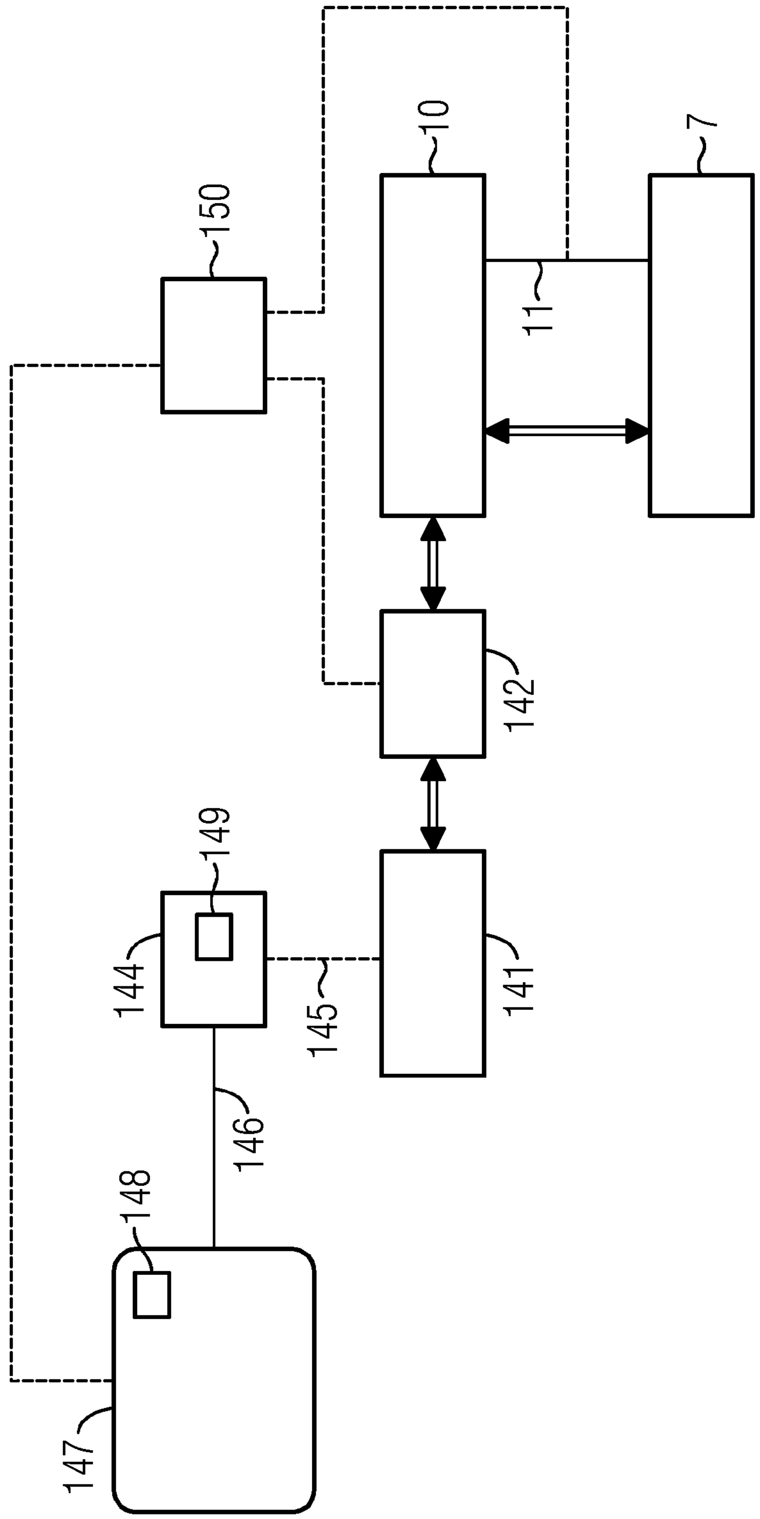
FIG. 3 illustrates a functional overview of components of the baking oven.

FIG. 3 shows a functional overview of components of the baking oven 1 associated with the motorized drive unit 141 and the kinematic coupling. As shown in FIG. 3, the motorized drive unit 141 is coupled with a torque-output side to the transmission 142 for transmitting torques and forces. The mechanical coupling between the motorized drive unit 141 and the transmission 142 as well as other mechanical couplings are depicted by a double arrow in FIG. 3. The transmission 142 is mechanically coupled to the door 10, for example via the door hinges 143 using a transmission or other types of drivelines. Further, the door 10 is mechanically coupled to the rack 7 via a coupling member 11, for example. The kinematic mechanical coupling thus corresponds to the configuration shown and described in connection with FIG. 1 and FIG. 2.

The configuration shown in FIG. 3 further involves a control unit 144 for activating and controlling the motorized drive unit 141. For this, the control unit 144 is coupled via a control line 145 to the motorized drive unit 141. By this, the control unit 144 is able to command the motorized drive unit 141 to start or stop operation.

The control unit 144 is, in the present example, connected via a transmission line 146 to a control interface 147. The control interface 147 may for example be implemented as or be part of a user interface of the appliance, and/or a user interface for the appliance provided on a remote device, such as a mobile device. The transmission line 146 may be one of wire-bound or wireless. However, the control interface 147 may be provided in other implementations and designs at or on different parts of the appliance.

The control interface 147 comprises at least one sensor unit 148 configured for sensing at least one of an opening, closing, extraction and retraction start and stop action or intent of a user. The sensor unit 148 is in the present example implemented as a touch-sensitive field on the control interface 147, which may comprise a touch-sensitive screen.

The control unit 144 is configured for activating the motorized drive unit 141 in response to a sensed start action or intent, and for deactivating the motorized drive unit in response to a sensed stop action or intent.

For example, the sensor unit 148 may have a dual function such that a first touch of the user may be interpreted as an instruction to open the door 10, and correspondingly to extract the rack 7.

Further a second touch of the user received via the sensor unit 148 while the door 10 is still opening may be interpreted as an instruction to stop the opening movement.

Further a third touch signal received via the sensor unit 148 from the user after the door 10 has reached the fully opened position may be interpreted as an instruction to close the door.

Yet further, a fourth touch signal of the user received while the door 10 is still closing may be interpreted as an instruction to stop the closing movement.

A touch signal of the user received after the second or fourth touch signal may either be interpreted as resuming the opening and closing movement, or as starting a closing or opening movement, respectively.

Other configurations are conceivable regarding the commands for starting and stopping the motorized drive unit 141.

Two or more separate sensor units may be provided for implementing the above-described user inputs for operating the door 10. Further, the control interface 147 may be configured to enable a user to set and program the functions associated with the sensor unit(s) 148 and/or associated with a received sequence of user inputs.

The given example describing opening and closing the door 10 applies mutatis mutandis for extracting and retracting the rack 7.

In the given example, the sensor unit 148 has been described as a touch sensitive sensor unit. However, the sensor unit 148 may comprise other and/or additional sensing properties and corresponding sensors. In particular, the sensor unit 148 may be or include one or more of a touch sensitive sensor unit, an acoustically sensitive sensor unit, a gesture sensitive sensor unit, a mechanical sensor unit, a door position sensor unit, a door movement sensor unit, a force sensitive sensor unit arranged to sense opening and/or closing forces applied to the door by a user.

Regarding some of the mentioned sensor types, it is to be noted, that mechanical sensor units may relate to switches or push-buttons, for example, which may be provided on a user interface of the appliance. A door position sensor unit may for example be provided in connection with or in the vicinity of the door 10 or in connection with the motorized drive unit 141 such that the position of the door 10, e.g. the opening angle of the door 10, may be detected. A signal corresponding to the opening angle of the door 10 may for example be used for controlling the opening and closing movement of the door 10. As an example, if the opening angle indicates that the door 10 is close to the fully opened or the fully closed position, the motorized drive unit 141 may be commanded to slow down to avoid hard end stops of the door 10, and correspondingly of the rack 7.

A door movement sensor unit may for example be provided in connection with the door 10, e.g. in connection with the hinge axis A and/or the door hinge 143. Such a door movement sensor unit may be configured to sense a movement of the door 10. If, for example, a movement of the door 10 in the closed position thereof is detected or a movement of the door 10 in the fully opened position thereof is detected, based for example on an attempt of the user to open or close the door 10, a corresponding opening or closing signal may be interpreted by the control unit 144 as an opening or closing command from a user. The control unit 144 may thus instruct the motorized drive unit 141 to open or close the door 10. If, for example, the movement sensor senses the door 10 stopping before reaching the fully opened position and the fully closed position, for example because a user tries to stop the opening or closing movement, such a signal may be interpreted as a stop signal, and the control unit 144 may instruct the motorized drive unit 141 to stop, in particular to stop immediately. This configuration in particular corresponds to a force sensitive sensor unit arranged to sense opening and/or closing forces applied to the door 10 by a user.

In embodiments, the appliance may comprise a sensor unit for sensing the power or force needed for opening and closing the door 10 and/or extracting and retracting the rack 7. Such sensors may for example be implemented as current sensors for monitoring the current consumption of the motorized drive unit 141. If, for example after an initial starting current peak, the current, as sensed by the current sensor, suddenly raises above a threshold, this event may be interpreted by the control unit 144 as an abnormal operating condition and instruct the motorized drive unit 141 to stop operation, in particular to stop immediately. By this, overloads of the motorized drive unit 141 and similar possibly detrimental situations may be avoided.

In embodiments, the sensor unit 148 may be implemented on or at a door handle of the baking oven 1. For example, the door handle may comprise one or more touch sensitive elements for detecting user inputs. Such inputs may be interpreted by the control unit 144 as a user instructions for example for opening and/or closing the door 10. In case of a door 10 hinged by means of a horizontal hinge axis, two separate control units 144 may be provided, one sensor unit 144 for opening the door 10 may be provided on or at the handle, and one sensor unit for closing the door 10 may be provided in a location that is easily accessible in the door opened position, for example on a face side or inner side of the door 10.

In example embodiments, the baking oven 1 may further comprise a safety control unit 149, which may be part of the control unit 144 as shown in FIG. 3, or implemented as a separate component. The safety control unit 149 may be adapted for stopping or reversing the operation of the motorized drive unit 141 in response to a cancellation signal received during the operation of the motorized drive unit 141. For example, the safety control unit 149 may be communicatively lined with a force sensitive sensor and/or a current sensor as described beforehand. Based on signals received from such sensors, the safety control unit 149 may command the motorized drive unit 141 to stop, in particular to stop immediately. Such situations may for example occur if the door 10 opens automatically and bumps against an object blocking the opening movement. The blocking event may be detected based on signals from a door movement sensor, a current sensor and similar, and in response to the detection, the movement of the door 10, i.e. the operation of the motorized drive unit 141 may be stopped. Any of the above-identified sensor types may be used in connection with the safety control unit 149.

In exemplary embodiments, the baking oven 1. i.e. the appliance, may further comprise an optional coupling control unit 150 cooperating, either electrically, electro-mechanically, or mechanically with one or more of the transmission 142 and the coupling member 11, more generally with one or more of the kinematic coupling units of the kinematic coupling mechanism, and/or with one or more motorized drive units 141.

The coupling control unit 150 is configured and coupled to the one or more kinematic coupling units, for example by controllable connector elements, such that a kinematic coupling of the kinematic coupling units can be activated and deactivated. In particular, the coupling control unit 150 may be configured to set different operational modes of the kinematic coupling mechanism for selectively establishing, suspending and/or modifying at least one of a kinematic coupling between the motorized drive unit 141 and the rack 7, a kinematic coupling between the motorized drive unit 141 and the door 10, and a kinematic coupling between the door 10 and the rack 7. The different operational modes of the coupling control unit 150 may be set according to user inputs on the control interface 147 communicatively coupled with the coupling control unit 150. By this, the user is enabled to set and define the kinematic chain that shall be active between the components according to respective needs.

The embodiments shown in connection with FIG. 1 to 3 show that the user is supported in operating the baking oven 1. In particular, as can be seen from FIG. 1, the tray rack 7 remains within the cavity 2 in the fully opened position of the door 10 mediated by the operation of the motorized drive unit 141, thereby avoiding any interferences with actions performed by a user in the region of the front opening 4 in the opened position of the door 10. Further, keeping the tray rack 7 within the cavity 2 may be advantageous in particular in connection with baking ovens 1 because the tray racks 7 are usually hot after baking procedures, thereby avoiding the risk of burn injuries. In particular the user may be greatly supported in connection with extraction and retraction movements of the tray 5 and with opening and closing movements of the door 10.

Figure 4:
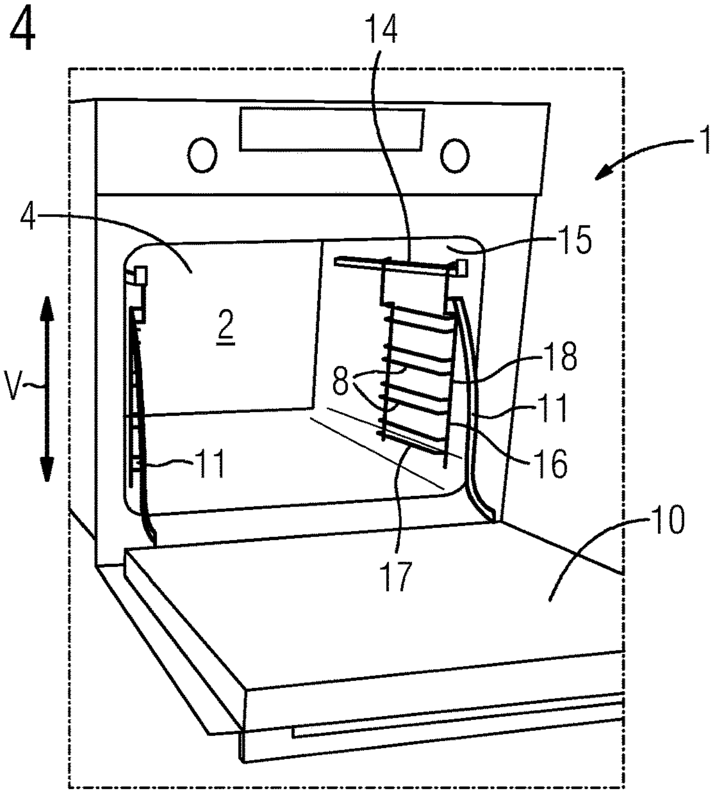
FIG. 4 illustrates a baking oven of a different embodiment viewed from a frontal perspective.

FIG. 4 illustrates a further embodiment of a baking oven 1 of a different embodiment concerning the kinematic coupling between the rack 7 and the door 10. Each lateral side wall 15 comprises a rack unit implemented as a wire rack 16 with several tray supports 8 spaced apart in vertical direction V. The wire racks 16 are part of the tray rack 7 for accommodating and supporting trays 5.

Each of the wire racks 16 is coupled to a coupling member 11 which in turn is coupled to the door 10 such that the pivoting movement of the door 10 is translated into a retraction movement (back) and extraction movement (forth), of the wire racks 16. The door 10 and/or rack may be coupled to a motorized drive unit as described in connection the embodiments shown in FIG. 1 to 3.

Instead of providing two coupling members 11, it is for example also possible to provide only a single coupling member 11, and an interconnecting element, such as a cross-connecting bar or rod or similar, between corresponding rack units. The interconnecting element may be attached to each rack unit for example at the back side, the top side, or the bottom side of the rack units. Instead of using interconnecting elements for mechanically coupling the rack units, the tray rack 7 may be implemented as a one-piece component.

As can be seen from FIG. 4, the wire racks 16 provide tray supports 8 for supporting the trays 5 at their opposed lateral side edges. Each tray support 8 comprises one or more horizontal wire rods 17 extending between vertical support bars 18, and configured for supporting or engaging a tray edge.

The upper end sections of the vertical support bars 18 are attached to a rail 14 to be movable in depth dimension D of the cavity 2 in an extraction and retraction movement. For the attachment, each vertical support bar 18 comprises in an upper end section a shoulder implemented as a bent section. The shoulder is designed to pass each vertical bar 18 around the lower and lateral inner side of the rail 14 facing the cavity interior 9, for movably coupling the wire rack 16, specifically the upper ends of the vertical bars 18, to the rail 14. The wire rack 16 may for example be movably coupled to the rail 14 by means of a runner or slider.

As may be seen from FIG. 4, the coupling members 11 are coupled to the wire racks 16 at the frontal sides thereof.

Figure 5:
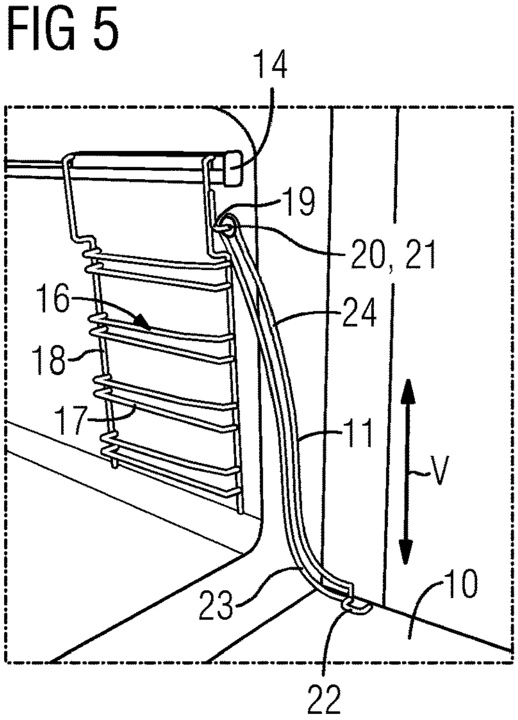
FIG. 5 illustrates a first enlarged section of the baking oven of FIG. 4.
Figure 6:
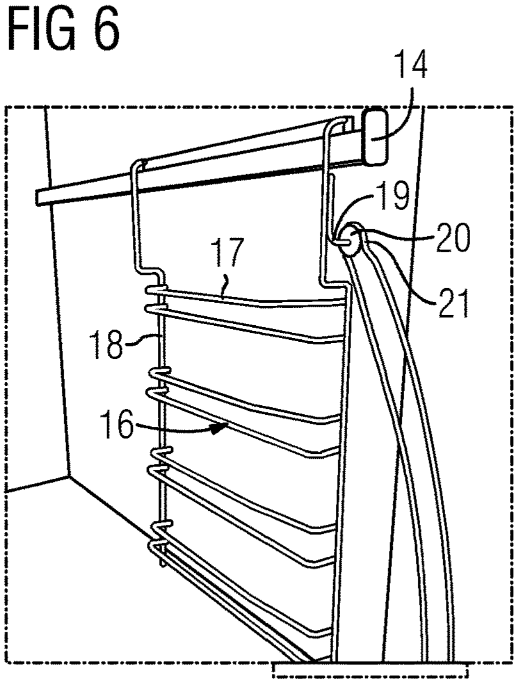
FIG. 6 illustrates a second enlarged section of the baking oven of FIG. 4.

In the embodiment according to FIG. 5 and FIG. 6, each wire rack 16 comprises at the frontal side thereof a cantilevering element 19 that is attached to the support bars 18. Each cantilevering element 19 comprises a free end that is arranged averted from the wire rack 16. At the free end, a complementary pivot mount 20 is provided, wherein the complementary pivot mount 20 is configured and arranged for pivotally mounting a first pivot mount 21 of one coupling member 11. The complementary pivot mount 20 is implemented as a disc or has a disc shape. The disc is attached to the free end of the cantilevering element 19.

The disc comprises a circumferential groove, extending in circumferential direction with regard to point of attachment of the free end of the cantilevering element 19. The first pivot mount 21 of the coupling member 11 in the present embodiment is implemented as a wire loop. The groove and the wire loop are mutually adapted such that the wire loop can engage the groove and run along the disc in circumferential direction thereof.

The coupling member 11 is implemented as a wire frame with two substantially parallel wire sections, in particular wire rods, running in lengthwise direction of the coupling member 11. The coupling member 11 may be implemented substantially in one piece as a single piece of bent wire. In embodiments, cross-bars may be provided between the wire sections or rods to obtain improved stability against transverse bending.

The engagement of the disc, groove, and loop are such that the coupling member 11 is pivotally coupled to the wire rack 16. In order to fix the first pivot mount 21 that comprises the loop to the disc, the transitional region between the loop and the adjacent sections of the coupling member 11 comprises a notch. By this, the disc may be prevented from moving along the gap between the parallel wire sections of the double wire structure, or respective movements may be limited.

At the end of the coupling member 11 averted from the first pivot mount 21, a second pivot mount 22 is provided which is coupled to the door 10. In the present example, the second pivot mount 22 is implemented as a bent section of a wire of the coupling member 11, wherein the bent section provides and defines a pivot pin and a corresponding pivot axis for pivotally coupling the coupling member 11 to the door 10. The bent section may be engaged and embraced by a corresponding complementary pivot mount, for example implemented as a kind of sleeve or bent tongue configured for accommodating the bent section as described further above.

As may be inferred from FIG. 5 and FIG. 6, the coupling member 11 has a double-curved structure with curvatures lying in a plane that substantially corresponds to the pivoting plane or plane of movement of the coupling member 11 in connection with opening and closing movements the door 10.

The double bent structure has the advantage that the coupling member 11 may be designed to follow the shape of the components of the baking oven 1, for example in the opened position of the door 10. By this, possible interferences with actions performed by a user may be largely avoided in the opened position of the door 10. Further, the double bent structure of the coupling member 11 provides advantages with regard to attaching the coupling member 11 to the tray rack 7 and door 10. Yet further, the double bent structure of the coupling member 11 provides advantages with regard to obtaining suitable and appropriate translation ratios between the pivoting movements of the door 10 and the back-and-forth retraction and extractions movement of tray rack 7.

In the example shown in connection with FIG. 4 to FIG. 6, the double bent structure of the coupling member 11 is provided such that a first bent 23 and a second bent 24 are implemented with opposite curvatures. The first bent 23 is located closer to the second pivot mount 22 and comprises centers of curvature that are located on a side of the coupling member 11 that faces away from the hinge axis A of the door 10. The second bent 24 is located closer to the first pivot mount 21 and comprises centers of curvature that are located on a side of the coupling member 11 facing the hinge axis A. Starting from the first pivot mount 21 in the ordinary mounting position of the coupling member 11 as shown for example in FIG. 5 and FIG. 6, the second bent 24 has a concave shape and the first bent 23 has a convex shape, wherein the terms concave and convex refer to the ordinary mathematical meaning of convex and concave.

The radii of curvature of the first bent 23 are smaller than the radii of curvature of the second bent 24.

Figure 7:
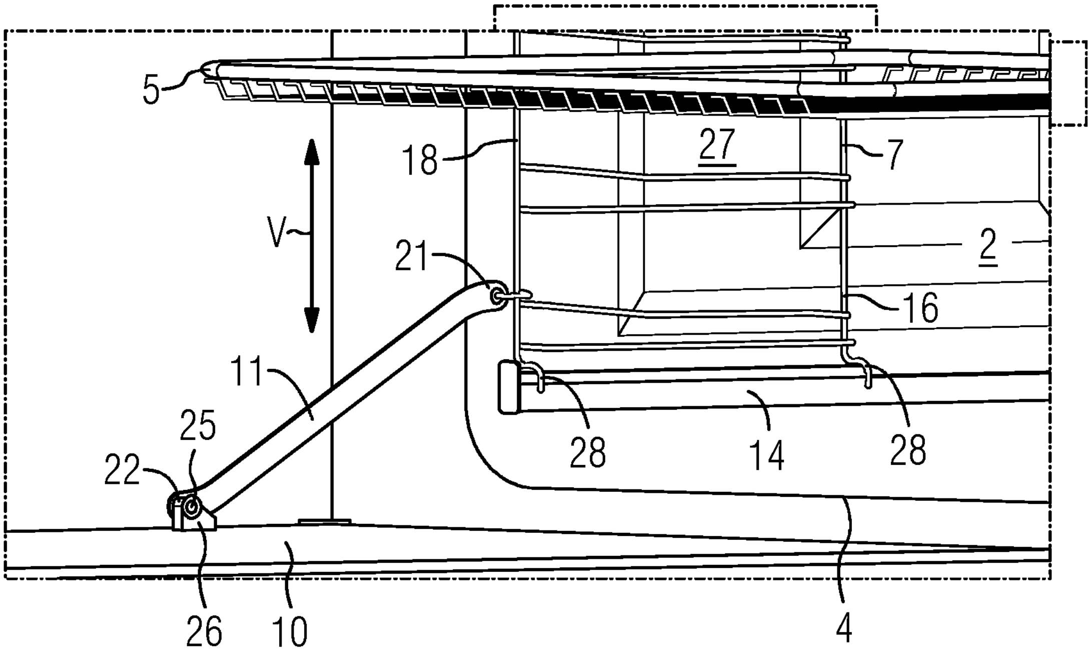
FIG. 7 illustrates a section of a baking oven of a further embodiment.

FIG. 7 shows a section of a baking oven of a further embodiment, wherein the embodiment differs from that of FIG. 5 and FIG. 6 in particular in the design of the coupling member 11 and the movable attachment of the tray rack 7 within the cavity 2.

Specifically, the coupling member 11 in the example of FIG. 7 is made from a solid or hollow material, for example in the form of a rod or bar. The coupling member 11 pivoted at the door 10 by a hub joint 25 pivotally interconnecting the second pivot mount 22 implemented in the present example as a hole with a corresponding hole or holes of a bearing projection 26 provided on an inner sheet of the door 10 by means of a pin or bolt.

In addition, the coupling member 11 shown in FIG. 7 has bent end sections in the region of the first and second pivot mounts 21 and 22 with comparative moderate curvature. The middle part of the coupling member 11 between the first and second pivot mounts 21 and 22 is substantially straight, it does not include intermediate bent sections.

The first pivot mount 21 of the coupling member 11 in the given example is implemented as a hole hingedly connected to one of the vertical support bars 18 of the tray rack 7 by means of a ring, e.g. a wire ring, in particular a circular ring.

A further difference to the solution of the example of FIG. 5 and FIG. 6 is that the wire rack 16 in FIG. 7 is movably supported on a rail 14 that is provided, in particular mounted or implemented, at the lower side, in particular at the bottom of the lateral side wall 27.

The wire rack 16, specifically the vertical support bars 18 thereof, comprise shoulders 28 at the bottom side thereof. A horizontal section of the shoulder 28 rests on an upper slide of the rail 14, in particular a runner of the rail 14. A vertical end section located at the bottom end of the shoulder 28 may engage a retaining element for supporting the wire rack 16 in vertical and/or in horizontal direction.

Yet another difference between the example embodiment of FIG. 5 and FIG. 6 on the one hand and the example embodiment of FIG. 7 on the other hand resides in the position of the attachment of the first pivot mount 21 and/or the second pivot mount 22. As may be seen from FIG. 5, the first pivot mount 21 is mounted in the upper part, in particular upper third, of the height of the cavity 2 when viewed in vertical direction V. In the embodiment in FIG. 7, the first pivot mount 21 is mounted in the lower part, in particular in the lower third, of the height of the cavity 2 when viewed in vertical direction V.

In all embodiments, the coupling members 11 and the location of the pivoting attachment of the first and second pivot mounts 21 and 22 are configured such that the tray rack 7, in particular the rack units, in particular the wire racks 16, are positioned within the back section of the cavity 2 in the closed position of the door 10 such that the tray 5, if property supported on the tray rack 7, is fully positioned within the cavity 2. Further, the mentioned component parts are configured such that the tray rack 7, in particular the rack units, such as the wire racks 16, are positioned near the front opening 4 in the opened position of the door 10, such that the tray 5, if properly supported on the tray rack 7, projects to a predefined amount out of the front opening 4. In other words, a predefined section of the tray 5, such as for example 10% to 20% (depending inter alia on the tray size) projects out of the front opening 4 in the opened position of the door 10. By this, the user can easily grasp the tray 5 and thereby is supported in inserting and removing the tray 5 from the tray rack 7.

The rail 14 comprises a frontal bumper 29 or frontal stopper for gently stopping, slowing down and/or restricting the forward movement, i.e. the extraction movement, of the wire rack 16 and/or for preventing the wire rack 16 or a corresponding slide from slipping or dropping off the rail 14. A rearward bumper or rearward stopper may be provided in embodiments, configured for gently stopping, slowing down and/or restricting the backward movement, i.e. the retraction movement, of the wire rack 16. The bumpers 29 may be configured for avoiding hard end stops of the door 10 and/or rack 7 when the door 10 and/or rack 7 that is driven by the motorized drive unit 141 reaches a respective end position. Corresponding bumpers or stoppers may also be provided with the other embodiments described herein.

Figure 8:
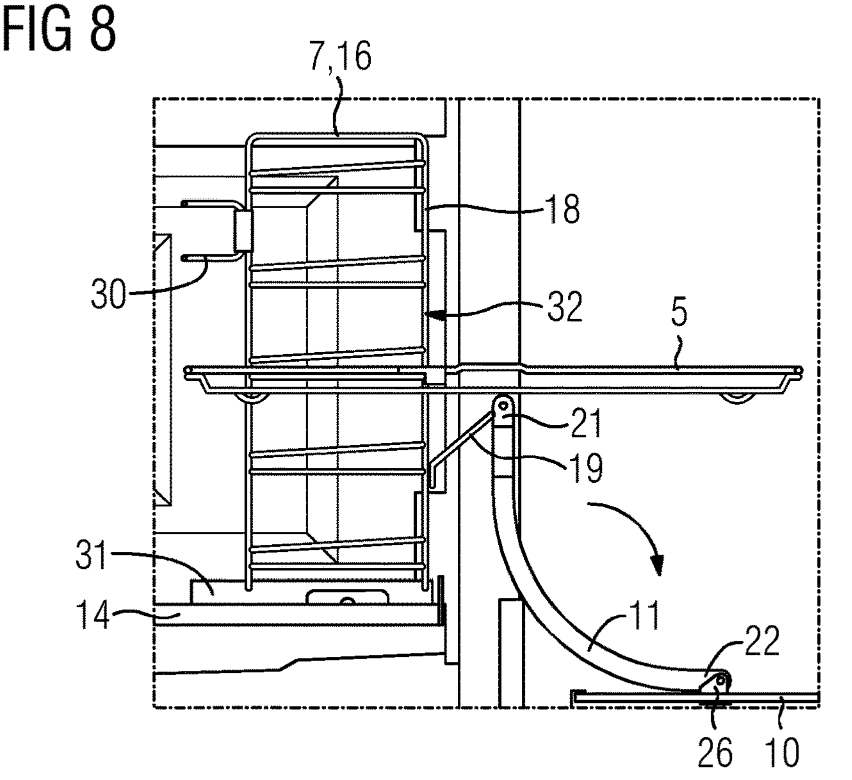
FIG. 8 illustrates a yet further embodiment of a baking oven with a coupling member in the opened position of the door.
Figure 9:
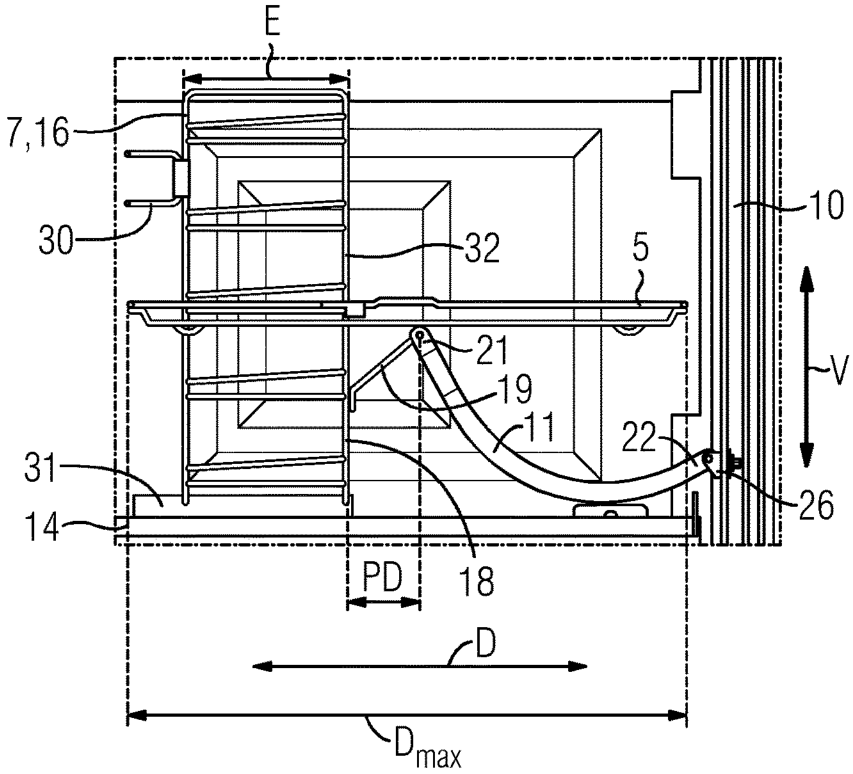
FIG. 9 illustrates the baking oven of FIG. 8 in the closed position of the door.
Figure 10:
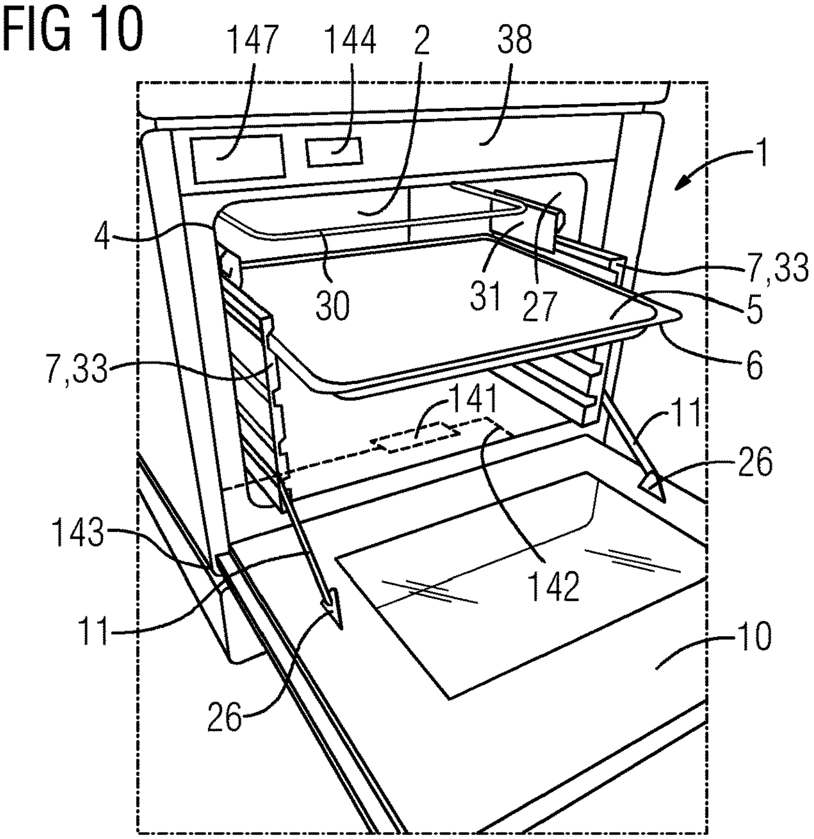
FIG. 10 illustrates a baking oven of a yet further embodiment.
Figure 11:
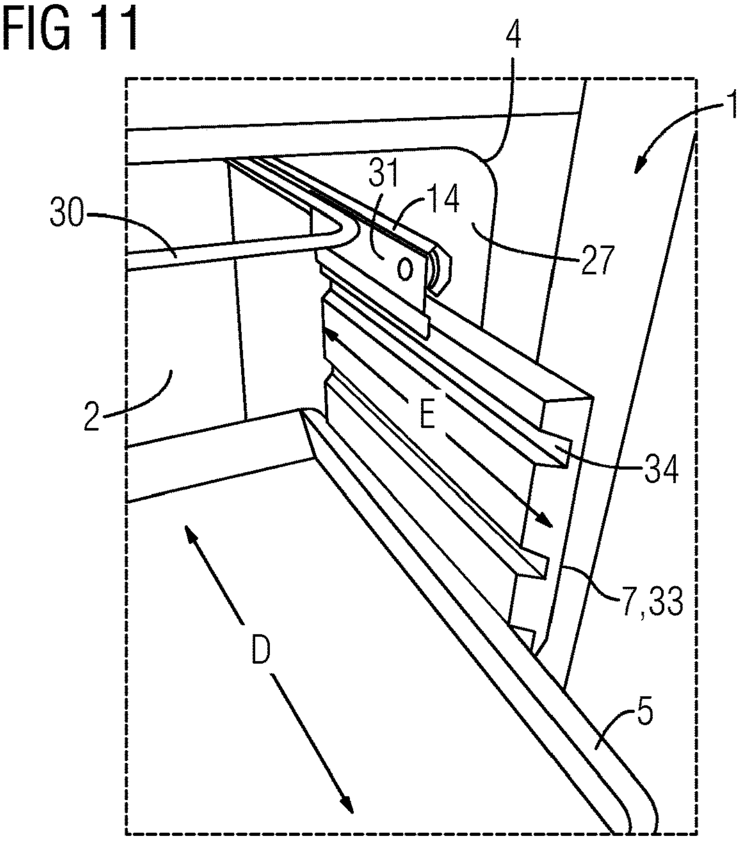
FIG. 11 illustrates an enlarged view of a section of the baking oven of FIG. 10.

FIG. 8 illustrates a further embodiment of a baking oven 1 with a coupling member 11, wherein the side view of FIG. 8 corresponds to the opened position of the door 10. FIG. 9 shows the baking oven of FIG. 8 in the closed position of the door 10. The coupling member as shown in FIGS. 10 and 11 has an arched shape with a single type of curvature, which is advantageous for obtaining appropriate torque transmission ratios between the door 10 and the rack 7, and/or for avoiding interferences with user actions in the opened position of the door 10 and extracted position of the rack 7.

In the embodiment shown in FIG. 8 and FIG. 9, the coupling member 11 is pivotally attached at the door 10 by means of a bearing projection 26 to which the second pivot mount 22, for example by means of a through-hole, is attached by a bolt or pin acting as the pivoting axis. The first pivot mount 21 is attached to the tray rack 7, by means of a cantilevering element 19. The connection between the coupling member 11 and the cantilevering element 19 may be established in that a through hole provided in the first pivot mount 21 is pivotally coupled to a pin or bolt section of the cantilevering element 19. The pin or bolt section, which may be implemented as a pin or bolt projection or as an intermediate section of the cantilevering element 19, may be provided at a frontal side of the cantilevering element 19 spaced apart a given distance from the frontal side 32 of the tray rack 7, specifically the wire rack 16.

The cantilevering element 19 is attached to a frontal side 32 of the tray rack 7. The attachment may be one of screwed, welded, or integral design. The cantilevering element 19 projects from the frontal side 32 such that the pivot axis for the first pivot mount 21 is positioned a predefined distance PD from the support bar 18, specifically a predefined distance PD from the point of attachment at the wire rack 16.

The cantilevering element 19 has a substantially triangular shape, with two legs extending from the pin or bolt section that is pivotally coupled to the coupling member 11 towards the wire rack 16. In the given example, an upper leg is arranged substantially vertically, whereas a lower leg is arranged inclined downwards. Based on the triangular shape, the mechanical strength of the cantilevering element 19 may be improved and specifically adapted to respective needs for translating the movements and forces occurring in connection with the movements of the door 10 into suitable forces and movements for moving the tray rack 7 back and forth in retraction and extraction movements for trays 5. The legs that define the cantilevering element 19 are positioned within a plane that is parallel to the plane of movement of the coupling member 11, and preferably perpendicular to the plane associated with the area of the front opening 4.

The coupling member 11 in the given example has an arched shape, which is convex in the present case when viewed from the first pivot mount 21 in the properly mounted position. The curvature of the arched shape is defined in a plane of curvature that is parallel to the plane of movement of the coupling member 11, and preferably perpendicular to the plane associated with the area of the front opening 4. The radius or the radii of curvature of the arched shape lie on a side of the coupling member 11 that is averted from the hinge axis A of the door 10, in particular averted from the bottom wall of the cavity 2, in the ordinary operating position of the door 10.

FIG. 10 and FIG. 11 illustrate a baking oven 1 of a further embodiment, wherein FIG. 11 illustrates an enlarged view of a section of the baking oven 1 shown in FIG. 10.

In the embodiment of FIG. 10 and FIG. 11, the tray rack 7 comprises two plate-like component parts, specifically two plate-like rack elements 33. Each of the rack elements 33 is arranged and positioned parallel to an inner lateral side wall 27 of the cavity 2.

The rack element 33 comprises a number of parallel grooves 34 oriented, in the properly mounted position, parallel to the depth dimension D of the cavity 2. The grooves 34 are arranged and configured such that they can accommodate opposed lateral side edges of the tray 5. Further, the grooves 34 are formed such that trays 5 can be placed at different vertical levels within the cavity 2.

The rack element 33 is movably attached to a rail 14 that is in the given example mounted at an upper site of a corresponding lateral side wall 27 of the cavity 2. The rack element 33 is movably coupled to the rail 14 by means of a slider element 31. The slider element 31 is fixedly attached to an upper side or edge of the rack element 33. Specifically, the slider element 31 is attached to a rear section of the rack element 33. The slider element 31 is movably coupled to the rail 14 for example by means of rolls or wheels engaged by the rail 14 which has a C-shaped cross section for encompassing the rolls or wheels and for guiding the rolls or wheels in lengthwise direction of the rail 14.

The rack elements 33 are kinematically coupled by an interconnector element 30, in particular for mechanically stabilising the arrangement and movement of the rack elements 33. In addition, by the interconnector element 30, the kinematic coupling between the door 10 and the tray rack 7 may be established by a single coupling member 11 provided, for example, on one of the lateral sides of the font opening 4. However, in the example shown in FIG. 10, two coupling members 11 are provided, wherein each coupling member 11 is coupled at one end to the door 10 by a bearing projection 26, and on the other end to the tray rack 7, specifically to the rack elements 33, by means of a suitable pivoting coupling.

FIG. 10 shows the motorized drive unit 141 that is kinematically coupled to the door 10 by the transmission 142, for example to the door hinges 143 of the door 10.

The motorized drive unit 141 may be an electric drive unit, a linear drive unit, a pneumatic drive unit or other type of drive unit, configured for automatically transferring the door 10 through the action of the motorized drive unit 141 and based on the kinematic coupling with the door 10 between the opened position of the door 10 and the closed position of the door 10.

For the reason that the door 10 is kinematically coupled to the motorized drive unit 141, and because the tray rack 7 is kinematically coupled to the door 10, these kinematically coupled elements represent a kinematic chain between the motorized drive unit 141 and the rack 7. Activating the motorized drive unit 141 results in an automatic extraction of the tray rack 7 out of the cavity 2 or in an automatic retraction of the tray rack 7 into the cavity 2.

If a tray 5 is positioned on the tray rack 7, activating the motorized drive unit 141 results in an automatic extraction of the tray 5 at least partially out of the cavity 2 or in an automatic retraction of the tray 5 into the cavity 2. By this, use and operation of the baking oven 1 in connection with extracting and retracting trays 5 may be simplified for the user.

The baking oven 1 of the example in FIG. 10 further shows an example implementation of a control interface 147. The control interface 147 is communicatively coupled with the control unit 144 which may be positioned behind the front plate 38 of the control interface 147. The control interface 147 may comprise a touch sensitive screen, and may mounted to or within the front plate 38.

Albeit the exemplary embodiments described in connection with the figures refer to a baking oven 1, the disclosed exemplary solutions, in particular connection with the tray racks 7, the coupling members 11, the motorized drive unit 141 and other aspects apply mutatis mutandis to other appliances.

Some advantageous embodiments of the device according to the invention have been described above. The invention is however not limited to the embodiments described above, but the inventive idea can be applied in numerous ways within the scope of the claims.

The invention claimed is:

1. An appliance comprising at least one of a particular cooking appliance and a baking oven, the appliance comprising:

a cavity comprising a back wall and an opposite front opening, the cavity configured to accommodate at least one carrier through the front opening;

a door arranged at the front opening and configured to open and close the front opening;

a rack comprising at least one carrier support configured to support, within the cavity, the at least one carrier, the rack being configured to be movable with respect to the cavity interior in an extraction and retraction movement;

one or more motorized drive units; and a kinematic coupling mechanism comprising one or more kinematic coupling units, the kinematic coupling mechanism configured to provide a kinematic coupling between the one or more motorized drive units and the rack and/or the at least one carrier;

wherein the one or more motorized drive units and the kinematic coupling mechanism are configured such that an operation of the one or more motorized drive units is translated into the extraction movement of the rack and/or the at least one carrier, and a reverse operation of the one or more motorized drive units is translated into the retraction movement of the rack and/or the at least one carrier.

2. The appliance according to claim 1, wherein the one or more kinematic coupling units are configured to establish a kinematic coupling between the door and the one or more motorized drive units such that the operation and/or reverse operation of the one or more motorized drive units is/are translated into an opening movement of the door and/or a closing movement of the door.

3. The appliance according to claim 2, wherein the one or more kinematic coupling units and the one or more motorized drive units are configured such that the operation and/or reverse operation of the one or more motorized drive units is/are translated into a synchronized movement of the door, the rack, and the at least one carrier, wherein the synchronized movement comprises at least one of an opening movement of the door associated with an extraction movement of the rack and/or the at least one carrier, and a closing movement of the door associated with a retraction movement of the rack and/or the at least one carrier.

4. The appliance according to claim 1, wherein at least two of the one or more motorized drive units, the rack, the at least one carrier, and the door are kinematically coupled by a kinematic chain configured to transmit forces or torques between the at least two of the one or more motorized drive units, the door, the at least one carrier, and the rack; and wherein at least one of:

at least one of the one or more motorized drive units is kinematically coupled to the door via a first kinematic coupling unit such that a force or torque generated by the operation and/or reverse operation of the one or more motorized drive units is/are translated into an opening and/or closing movement of the door, wherein the door is kinematically coupled via a second kinematic coupling unit to the rack and/or the at least one carrier such that a force or torque generated by the opening and/or closing movement of the door is translated into the extraction and/or retraction movement of the rack and/or the at least one carrier, the kinematic chain is configured to provide a synchronization between the opening movement of the door and the extraction movement of the rack and/or the at least one carrier, and a synchronization between the closing movement of the door and the retraction movement of the rack and/or the at least one carrier;

at least one motorized drive unit of the one or more motorized drive units is kinematically coupled to the rack and/or the at least one carrier via a third coupling unit such that the force or torque generated by the operation and/or reverse operation of the at least one motorized drive unit is/are translated into the extraction and/or retraction movement of the rack and/or the at least one carrier, wherein the rack and/or the at least one carrier is/are kinematically coupled via a fourth kinematic coupling unit to the door such that a force or torque generated by the extraction movement and/or retraction movement is translated into the opening and/or closing movement of the door, and the kinematic chain is configured to provide a synchronization between the opening movement of the door and the extraction movement of the rack and/or the at least one carrier, and a synchronization between the closing movement of the door and the retraction movement of the rack and/or the at least one carrier.

5. The appliance according to claim 1, wherein at least one of:

the one or more motorized drive units comprise at least one motorized drive unit selected from a group consisting of a rotary motor and linear motor; and the one or more motorized drive units comprise at least one drive unit selected from a group consisting of a belt drive unit, a gear drive unit, a lever-gear drive unit, a slewing gear drive unit, and a Bowden drive unit.

6. The appliance according to claim 1, further comprising a control unit configured to at least one of activate and control the one or more motorized drive units, the control unit arranged in association with at least one sensor unit configured to sense at least one of an opening, closing, extraction, and retraction start and stop action or intent of a user, wherein the control unit is further configured to at least one of activate the one or more motorized drive units in response to a sensed start action or intent, and deactivate the one or more motorized drive units in response to a sensed stop action or intent.

7. The appliance according to claim 6, wherein the sensor unit is selected from a group consisting of: a touch sensitive sensor unit, an acoustically sensitive sensor unit, a gesture sensitive sensor unit, a mechanical sensor unit, a door position sensor unit, a door movement sensor unit, and a force sensitive sensor unit arranged to sense at least one of opening and closing forces applied to the door by a user.

8. The appliance according to claim 6, wherein the sensor unit is arranged in connection with at least one of a user interface of the appliance, a door handle of the appliance, a door hinge assembly of the appliance, and an application configured for execution by a remote device configured to communicate sensor signals to the appliance, the signals configured to activate and/or deactivate the one or more motorized drive units.

9. The appliance according to claim 1, further comprising a safety control unit configured to stop and/or reverse operation of the one or more motorized drive units in response to a cancellation signal received during the operation of the one or more motorized drive units.

10. The appliance according to claim 9, wherein the cancellation signal is indicative of at least one of an abnormal operating condition of the motorized drive unit and a user input action for stopping and/or reversing the motorized drive unit.

11. The appliance according to claim 10, wherein:

the safety control unit further comprises at least one safety control sensor unit for detecting the abnormal operating condition and/or the user input action, the safety control sensor unit comprises at least one safety sensor configured to sense the abnormal operational condition and/or the user input action, and the at least one safety control sensor comprises a sensor selected from a group consisting of a touch sensitive sensor, an acoustically sensitive sensor, a gesture sensitive sensor, a power consumption sensor, and a current sensor configured to sense power consumption of the motorized drive unit in operation.

12. The appliance according to claim 1, further comprising a coupling control unit configured and arranged to cooperate with the one or more kinematic coupling units of the kinematic coupling mechanism, wherein the coupling control unit is operable in different operational modes configured to at least one of selectively establish, suspend, and modify at least one of a kinematic coupling between the one or more motorized drive units and the rack, a kinematic coupling between the one or more motorized drive units and the door, and a kinematic coupling between the door and the rack.

13. The appliance according to claim 12, wherein the appliance comprises a setting unit configured to enable a user to set one of the different operational modes of the coupling control unit.

14. The appliance according to claim 1, wherein:

the cavity interior comprises a depth dimension from the front opening to the back wall a maximum depth dimension configured to accommodate the carriers;

the rack comprises a depth extension, measured parallel to a depth dimension of the cavity, that is 10% to 50% of the maximum depth dimension; and the kinematic coupling mechanism and depth extension of the rack are configured such that in at least one operational mode:

the rack is fully positioned within the cavity in the door closed position, and the rack at most partially projects out of the front opening in the door fully opened position.

15. The appliance according to claim 1, wherein:

at least one of the one or more kinematic coupling units comprises a coupling member coupled by a first pivot mount at one end to a frontal section of the rack and by a second pivot mount at the other end to the door;

the rack optionally comprises, at the frontal section, at least one cantilevering element having a free end with a complementary pivot mount configured to pivot mount one of the first and second pivot mounts;

the cantilevering element is optionally arranged to project at the frontal side of the rack parallel to or perpendicular to the depth dimension of the cavity; and the cantilevering element optionally comprises a triangular design with two legs extending between at least one of a frontal section and a frontal side of a bar, of the rack and the complementary pivot mount, and at least one of the cantilevering element and the legs, fix the complementary pivot mount at a predefined distance from an attachment site of the cantilevering element at a frontal section of the rack.

16. The appliance according to claim 1, further comprising at least one damping mechanism or damping element configured to damp movements mediated by the kinematic coupling mechanism between at least two of the rack, the door, and the one or more motorized drive units.

17. The appliance according to claim 1, wherein:

at least one of the kinematic coupling units comprises at least one of a coupling member, a coupling rod, a coupling bar, and a wire frame, and is arranged to provide a kinematic coupling between the rack and the door, and the kinematic coupling unit is pivotally attached to the rack and door and is curved or bent with reference to a plane of curvature or plane of bending, the plane of curvature or plane of bending being parallel to a pivoting plane of the kinematic coupling unit.

18. The appliance according to claim 1, wherein the rack comprises at least one of a rack unit, a wire rack, and a plate-like rack element, arranged to move with respect to the interior of the cavity, wherein the rack is arranged to be movably associated with one inner lateral side wall of the cavity extending between the back wall and the front opening, and wherein the rack is arranged to be movable parallel to the depth dimension and/or the respective side wall.

19. The appliance according to claim 1, wherein the at least one carrier comprises a tray and/or grid.

* * * * *